United States Patent
Taketa et al.

(10) Patent No.: US 8,329,280 B2
(45) Date of Patent: Dec. 11, 2012

(54) CHOPPED FIBER BUNDLE, MOLDING MATERIAL, AND FIBER REINFORCED PLASTIC, AND PROCESS FOR PRODUCING THEM

(75) Inventors: Ichiro Taketa, Ehime (JP); Eisuke Wadahara, Ehime (JP); Narumichi Sato, Ehime (JP)

(73) Assignee: Toray Industries, Inc. (JP)

( * ) Notice: Subject to any disclaimer, the term of this patent is extended or adjusted under 35 U.S.C. 154(b) by 432 days.

(21) Appl. No.: 12/602,288

(22) PCT Filed: Apr. 23, 2008

(86) PCT No.: PCT/JP2008/057849
§ 371 (c)(1),
(2), (4) Date: Nov. 30, 2009

(87) PCT Pub. No.: WO2008/149615
PCT Pub. Date: Dec. 11, 2008

(65) Prior Publication Data
US 2010/0178495 A1    Jul. 15, 2010

(30) Foreign Application Priority Data
Jun. 4, 2007    (JP) .................................. 2007-147733

(51) Int. Cl.
*B32B 27/00* (2006.01)
*D02G 3/22* (2006.01)

(52) U.S. Cl. ............................ 428/105; 428/98; 428/114
(58) Field of Classification Search .................. 428/105, 428/98, 114
See application file for complete search history.

(56) References Cited

U.S. PATENT DOCUMENTS
3,508,461 A    4/1970    Stream

FOREIGN PATENT DOCUMENTS

| JP | 49-72786 A | 7/1974 |
| JP | 50-17710 B1 | 6/1975 |
| JP | 62-48730 A | 3/1987 |
| JP | 1-163218 A | 6/1989 |
| JP | 4-133704 A | 5/1992 |
| JP | 5-42538 A | 2/1993 |
| JP | 2003-165739 A | 6/2003 |
| JP | 2003-251589 A | 9/2003 |
| JP | 2005-170765 A | 6/2005 |
| JP | 2006-130698 A | 5/2006 |

*Primary Examiner* — Brent O'Hern
(74) *Attorney, Agent, or Firm* — DLA Piper LLP (US)

(57) ABSTRACT

A chopped fiber bundle includes a large number of unidirectionally arranged reinforced fibers. The length of each of the reinforced fibers is in the range of 5 to 100 mm. The chopped fiber bundle has a transition segment in which the number of the reinforced fibers increases toward the central part of the chopped fiber bundle in the aligned direction of the reinforced fibers with both ends in the aligned of the reinforced fibers in the chopped fiber bundle being a starting point. The level of a change in total sectional area of the large number of reinforced fibers is not more than 0.05 mm$^2$ per mm in the aligned direction of the reinforced fibers over the whole area in the longitudinal direction of the chopped fiber bundle.

17 Claims, 6 Drawing Sheets

CHOPPED FIBER BUNDLE, MOLDING MATERIAL, AND FIBER REINFORCED PLASTIC, AND PROCESS FOR PRODUCING THEM

RELATED APPLICATIONS

This is a §371 of International Application No. PCT/JP2008/057849, with an international filing date of Apr. 23, 2008 (WO 2008/149615 A1, published Dec. 11, 2008), which is based on Japanese Patent Application No. 2007-147733, filed Jun. 4, 2007, the subject matter of which is incorporated by reference.

TECHNICAL FIELD

This disclosure relates a chopped fiber bundle comprising a large number of reinforcing fibers, a molding material comprising an aggregate of a large number of the chopped fiber bundles used for molding of a fiber reinforced plastic, and a fiber reinforced plastic comprising an aggregate of a large number of the chopped fiber bundles and a matrix resin.

BACKGROUND

Since fiber reinforced plastics comprising a large number of reinforcing fibers and a matrix resin are high in specific strength and specific modulus, excellent in mechanical characteristics and have high performances such as weather resistance and chemical resistance, they are drawing attention also in industrial application and their demand is increasing year by year.

As a molding method of fiber reinforced plastic having high performance, autoclave molding method is mentioned in which material bases of semi-cured state (prepreg) of a large number of continuous reinforcing fibers impregnated with a matrix resin are laminated, and a fiber reinforced plastic is molded by curing the matrix resin by heat-pressurizing the obtained laminate in a high temperature-high pressure oven. This autoclave molding method is widely used.

On the other hand, as another molding method of fiber reinforced plastic, RTM (resin transfer molding) molding method is mentioned in which, for purpose of increasing production efficiency, material base comprising a large number of continuous reinforcing fibers (preform) shaped into a desired member shape is impregnated beforehand with a matrix resin, and the impregnated matrix resin is cured.

The fiber reinforced plastic obtained by these molding methods, since the large number of reinforcing fibers are continuous fibers, has excellent mechanical property. Also, since these large number of continuous fibers are arranged regularly in the material base, it is possible to design such that the fiber reinforced plastic has a necessary mechanical property by arrangement of the material bases to be laminated, and dispersion of mechanical property of the obtained fiber reinforced plastic is also small. However, on the other hand, since each of the large number of reinforcing fibers is a continuous fiber, it is difficult to form into a complicated shape such as a three dimensional shape, and these molding methods are used for production only of members of approximately flat shape.

As molding method suitable for molding a molded article having complicated shape such as a three dimensional shape, molding methods in which an SMC (sheet molding compound) sheet or a stampable sheet is used are mentioned.

The SMC molding method is a molding method in which an SMC sheet, made into semi-cured state by impregnating chopped fiber bundle, comprising a large number of reinforcing fibers which are usually cut into approximately 25 mm, with a thermosetting resin as matrix resin, is molded by heat-pressing by using a heat-press machine.

The stampable sheet molding method is a molding method in which a stampable sheet, made by impregnating chopped fiber bundle, comprising a large number of reinforcing fibers which are usually cut into approximately 25 mm, with a thermoplastic resin as matrix resin, is molded by being heated to melting point or more of the thermoplastic resin and arranging on a mold controlled to a predetermined temperature to be cold-pressed.

In many cases, molding is carried out by arranging an SMC sheet or a stampable sheet cut smaller than desired molded article shape on a mold and by extending (by flowing) the sheet arranged on the mold into the shape of the above-mentioned molded article by pressurizing. For that reason, by the flow of the matrix resin and a large number of the cut reinforcing fibers, a mold following capability into complicated shape such as a three dimensional shape can be obtained.

However, chopped fiber bundle used in the conventional SMC sheet or stampable sheet is produced by cutting a continuous reinforcing fiber bundle comprising a large number of unidirectionally arranged continuous reinforcing fibers in perpendicular direction to the arranging direction of reinforcing fiber. When a force is loaded on the molded article molded with a large number of such chopped fiber bundles and the matrix resin (fiber reinforced plastic), almost all of its force is born by a large number of chopped fiber bundles. That is, the large number of chopped fiber bundles shares the force with each other via the matrix resin.

In this case, in a conventional molded article, since the end of each reinforcing fiber at tip portion of the chopped fiber bundle is located at a plane perpendicular to the arranging direction of reinforcing fiber, a state in which the force is immediately shared to an adjacent chopped fiber bundle is arisen. In this state, a stress concentration is generated at the portion. When this stress concentration is generated, even in the case where the force is small, the portion is broken by the stress concentration, to generate a crack in the molded article. The generated crack is linked to other cracks, to bring about a breakage of the whole molded article.

In the conventional SMC sheet or stampable sheet, since length of each reinforcing fiber of the chopped fiber bundle used therein is about 25 mm, although a flowability of the reinforcing fiber at forming a molded article can be obtained, since the end of each reinforcing fiber is located at the plane perpendicular to the arranging direction of reinforcing fiber, there was a problem that a crack is easy to be generated in the molded article which is molded.

To solve this problem, some SMC sheets have been proposed (e.g., JP 62-048730 A and JP 01-163218 A) which are produced by using chopped fiber bundles consisting of a decreased number of reinforcing fibers to increase the entanglement of the chopped fiber bundles for increased densification which serves to prevent the generation and propagation of cracks in the molded material. On the other hand, in the thin chopped fiber bundle of which number of reinforcing fibers is decreased, since the chopped fiber bundle apt to cohere with each other, a dispersion in distribution or orientation of the reinforcing fibers in the molded article is easy to be generated, there is a problem that mechanical characteristics of the obtained molded article lowers.

It could therefore be helpful in view of these problems to provide a chopped fiber bundle having good flowability and mold conformability in the case where it is used as a molding material, and exhibits excellent mechanical property in the case where it is used as a fiber reinforced plastic, and a production method thereof.

It could also be helpful to provide a molding material and a fiber reinforced plastic in which the chopped fiber bundle is used, and a production method thereof.

SUMMARY

We thus provide a chopped fiber bundle comprising:
(a) a large number of unidirectionally arranged reinforcing fibers and a bundling agent which bundles the large number of reinforcing fibers, wherein
(b) the fiber length of the reinforcing fiber is 5 to 100 mm,
(c) the chopped fiber bundle has a first transition section in which the number of the reinforcing fibers in the cross-section of the fiber bundle perpendicular to the arranging direction of the reinforcing fibers increases from the first tip which is one of the tips in the arranging direction of the reinforcing fibers toward the second tip which is the other tip and also has a second transition section in which the number of the reinforcing fibers in the cross-section of the fiber bundle increases from the second tip toward the first tip, and
(d) the chopped fiber bundle further has a constant section, located between the first transition section and the second transition section in the arranging direction of the reinforcing fibers, in which the number of reinforcing fibers in the cross-section of the fiber bundle is constant, wherein one of the end faces of the constant section coincides with the first terminal end face of the first transition section which is at the opposite end to the first tip while the other end face of the constant section coincides with the second terminal end face of the second transition section which is at opposite end to the second tip, or wherein the first terminal end face directly coincides with the second terminal end face, and wherein
(e) between the first tip and the second tip, the changes in the total cross-sectional area of the reinforcing fibers in the cross-section of the fiber bundle, measured along the arranging direction of the reinforcing fiber, is 0.05 mm$^2$ or less per 1 mm.

In the chopped fiber bundle, it is better if the large number of reinforcing fibers is arranged substantially in one direction. The state where the reinforcing fibers are arranged in substantially one direction refers to a state in which, when looking at a portion of the chopped fiber bundle, 90% or more of the reinforcing fibers existing within a 5 mm radius are arranged within an angle of ±10° with respect to the arranging direction of reinforcing fiber existing in the portion of the chopped fiber bundle.

It is preferable that the maximum value of the total cross-sectional area of the reinforcing fibers is 0.1 mm$^2$ or more.

It is preferable that the maximum value of the total cross-sectional area of the reinforcing fibers is less than 0.1 mm$^2$ and, between the first tip and the second tip, the change in the number of the reinforcing fibers in the cross-section of the fiber bundle, measured along the arranging direction of the reinforcing fibers, is 30% or less of the maximum number of reinforcing fibers per 1 mm.

It is preferable that each fiber length of the reinforcing fibers is the same. It is no problem if this each fiber length is substantially the same. The state where the fiber lengths are substantially the same refers to a state in which the reinforcing fibers having a fiber length in the range of ±5% from the average value of fiber lengths of the reinforcing fibers contained in the chopped fiber bundle account for 95% of the total reinforcing fibers of the chopped fiber bundle.

It is preferable that the reinforcing fiber is a carbon fiber, that the number of the carbon fibers is 1,000 to 700,000, and that between the first tip and the second tip, the change in the number of the reinforcing fibers in the cross-section of the fiber bundle, measured along the arranging direction of the reinforcing fibers, is 1,400 or less per 1 mm.

In a plan view in which a state is drawn where width of perpendicular direction to the arranging direction of the reinforcing fiber of the chopped fiber bundle becomes largest, when the largest width is put to Wb, and in the cross-section of fiber bundle at position of the largest width, largest thickness of the chopped fiber bundle in perpendicular direction to the plan view is put to Tb, it is preferable that the value of ratio Wb/Tb is 20 to 400.

It is preferable that, in a plan view of the state is drawn where width of perpendicular direction to the arranging direction of the reinforcing fiber of the chopped fiber bundle becomes largest, one sides from the tip to the terminal end in external shape of both transition sections of the first transition section and the second transition section are formed by straight segments along the arranging direction of the reinforcing fiber, and the other sides are formed by straight segments inclined by an angle of 2 to 30° with respect to the arranging direction of the reinforcing fiber.

The bundling agent may be a sizing agent used when the reinforcing fiber bundle is produced, and an amount of the sizing agent to the chopped fiber bundle may also be 0.1 to 10 mass %.

The bundling agent may be a matrix resin used when a resin molded material containing reinforcing fibers is produced, and an amount of the matrix resin to the chopped fiber bundle may also be 20 to 75 mass %.

The change is an absolute value of increasing or decreasing.

A molding material comprises an aggregate of chopped fiber bundles in which the large number of chopped fiber bundles are integrated into one body by a bundling agent for chopped fiber bundles and/or by entanglement of the reinforcing fibers in adjacent chopped fiber bundles.

In the molding material, it is preferable that the bundling agent is a matrix resin used when a resin molded material containing reinforcing fibers is produced, an amount of the matrix resin to the chopped fiber bundle is 20 to 75 mass % and, in addition, the aggregate of the chopped fiber bundles is in a form of a sheet.

Arranging directions of the reinforcing fibers in each chopped fiber bundle in the sheet aggregate of chopped fiber bundles may also be the same, respectively. The arranging directions of the reinforcing fibers in each chopped fiber bundle in the aggregate of the chopped fiber bundles may substantially be the same, respectively. The state where the arranging directions of the reinforcing fibers in each chopped fiber bundle are substantially the same refers a state in which, when the average of the arranging directions of the reinforcing fibers contained in the chopped fiber bundle is taken as the representative arranging direction of the reinforcing fibers in the chopped fiber bundle, those chopped fiber bundles in the chopped fiber bundle aggregate with their representative arranging directions staying within ±10% account for 90% or more of the chopped fiber bundles in the aggregate of chopped fiber bundles.

It is preferable that the aggregate of the chopped fiber bundles comprises a laminate including a lamination of a plurality of the sheets of aggregate of the chopped fiber bundles, and in the laminate, arranging directions of the reinforcing fibers in one of the layers of the sheet of aggregate of the chopped fiber bundles and another layer are different from each other.

Arranging directions of the reinforcing fibers in each chopped fiber bundle in the aggregate of the chopped fiber bundles may also be random.

In a cross-sectional shape, the aggregate of the chopped fiber bundles may also be three-dimensionally shaped to have at least one bending portion.

Another example of the molding material comprises a pellet for injection molding formed with a mixture of a large number of the chopped fiber bundle and a thermoplastic resin.

A fiber reinforced plastic comprises an aggregate of a large number of chopped fiber bundles and a matrix resin integrated with the aggregate of chopped fiber bundles.

In the fiber reinforced plastic, it is preferable that, in the cross-section of thickness direction of the fiber reinforced plastic, at least 20 of the chopped fiber bundles are accumulated in the thickness direction.

A chopped fiber bundle production method comprises:
(a) a continuous reinforcing fiber bundle supplying step which supplies a continuous reinforcing fiber bundle comprising a large number of unidirectionally arranged continuous reinforcing fibers and a bundling agent to bundle the reinforcing fibers, and
(b) a continuous reinforcing fiber bundle cutting step in which chopped fiber bundles are formed by cutting the continuous reinforcing fiber bundle supplied from the continuous reinforcing fiber bundle supplying step, at constant intervals in the longitudinal direction of the continuous reinforcing fiber bundle, wherein
(c) the continuous reinforcing fiber bundle is cut in the continuous reinforcing fiber bundle cutting step, in such a manner that each chopped fiber bundle formed in the continuous reinforcing fiber bundle cutting step meets the requirements of the chopped fiber bundle.

In the continuous reinforcing fiber bundle supplying step, there will be no problems if the large number of continuous reinforcing fibers are substantially arranged in one direction. The state where the continuous reinforcing fibers are arranged in substantially one direction refers to a state in which, when looking at a portion of the chopped fiber bundle, 90% or more of the reinforcing fibers existing within a 5 mm radius are arranged within an angle of ±10° with respect to the arranging direction of reinforcing fibers existing in the portion of the continuous chopped fiber bundle.

In the production method of chopped fiber bundle, it is preferable that the continuous reinforcing fiber bundle supplying step includes a continuous reinforcing fiber bundle opening step in which the continuous reinforcing fiber bundle is opened such that the arrangement of the large number of reinforcing fibers in cross-section of the continuous reinforcing fiber bundle is made into flat.

The bundling agent may be a sizing agent used when the continuous reinforcing fiber bundle is produced and an amount of the sizing agent to the continuous reinforcing fiber bundle may also be 0.1 to 10 mass %.

The bundling agent may be a matrix resin used when a resin molded material containing reinforcing fibers is produced and the amount of the matrix resin to the continuous reinforcing fiber bundle may be 20 to 75 mass %.

Another example of the production method of the chopped fiber bundle comprises:
(a) a continuous reinforcing fiber sheet supplying step that supplies a continuous reinforcing fiber sheet in which a plurality of continuous reinforcing fiber bundles comprising a large number of unidirectionally arranged continuous reinforcing fibers are arranged in parallel,
(b) a prepreg sheet forming step that forms a prepreg sheet in which the continuous reinforcing fiber sheet supplied by the continuous reinforcing fiber sheet supplying step is placed on a resin sheet formed from a matrix resin to be used to produce a resin molded material containing reinforcing fibers, followed by combining the reinforcing fiber and the matrix resin, and
(c) a prepreg sheet cutting step in which the prepreg sheet formed in the prepreg sheet forming step is cut at constant intervals in the arranging direction of the reinforcing fibers, or cut at constant intervals both in the arranging direction of the reinforcing fiber and in the direction perpendicular to the arranging direction of the reinforcing fibers, to form a chopped fiber bundle, wherein
(d) the prepreg sheet is cut in the prepreg sheet cutting step, in such a manner that each chopped fiber bundle formed in the prepreg sheet cutting step meets the requirements of the chopped fiber bundle.

In the continuous reinforcing fiber sheet supplying step, there will be no problems if the large number of unidirectionally arranged continuous reinforcing fibers is arranged in substantially one direction. The state where the continuous reinforcing fibers are arranged in substantially one direction refers to a state in which, when looking at a portion of the continuous chopped fiber bundle comprising a large number of continuous reinforcing fibers, 90% or more of the reinforcing fibers existing within a 5 mm radius are arranged within an angle of ±10° with respect to the arranging direction of reinforcing fibers existing in the portion of the continuous chopped fiber bundle.

It is preferable that, in the prepreg sheet forming step in the another example of the production method of chopped fiber bundle, on the resin sheet on which the continuous reinforcing fiber sheet is placed, another resin sheet formed from a matrix resin to be used when a resin molded article containing reinforcing fibers is produced is placed, the reinforcing fibers and the matrix resin are integrated and, in addition, a prepreg sheet is formed in a condition in which an amount of the matrix resin is controlled such that the amount of the matrix resin in the chopped fiber bundle to be obtained is made into 20 to 75 mass %.

A production method of a molding material comprises:
(a) a chopped fiber bundle scattering step in which a large number of chopped fiber bundles are scattered on a molding base in such a manner that the large number of chopped fiber bundles are accumulated in one or more layers, and
(b) a chopped fiber bundle aggregate forming step to form a molding material comprising an aggregate of chopped fiber bundles, by bonding together the large number of chopped fiber bundles scattered on the molding base to form an aggregate.

In the chopped fiber bundle scattering step in the production method of molding material, it is preferable that the molding base has a flat surface, and the chopped fiber bundles are scattered on the flat surface such that arranging directions of reinforcing fibers of each of the large number of chopped fiber bundles on the flat surface is made into the same and, in addition, on the flat surface, a chopped fiber bundle sheet comprising the large number of chopped fiber bundles is formed, and in the aggregate of chopped fiber bundles forming step, a molding material comprising the chopped fiber bundle sheet formed with the large number of chopped fiber bundles is formed.

There will be no problems if the arranging direction of the respective reinforcing fibers of the large number of chopped fiber bundles on the flat surface is substantially the same. The state where the arranging direction of the reinforcing fibers in each chopped fiber bundle is substantially the same refers to a state in which, when the average of the directions of the reinforcing fibers contained in a chopped fiber bundle is taken as the representative arranging direction of the reinforcing fibers in the chopped fiber bundle, those chopped fiber bundles in the chopped fiber bundle aggregate with their representative arranging directions staying within ±10% account for 90% or more of the total chopped fiber bundles in the chopped fiber bundle aggregate.

In the production method of molding material, it is preferable that, after forming the chopped fiber bundle sheet, the chopped fiber bundles are scattered on the formed chopped fiber bundle sheet such that arranging directions of reinforcing fiber of the respective large number of chopped fiber bundles are made into the same and, in addition, are made different from arranging direction of reinforcing fiber of chopped fiber bundle in the formed chopped fiber bundle sheet and, further, such that another chopped fiber bundle sheet comprising the large number of chopped fiber bundles is formed on the formed chopped fiber bundle sheet, to form a molding material comprising a laminate of chopped fiber bundle sheets.

It is no problem if the arranging direction of the respective reinforcing fibers of the large number of chopped fiber bundles on the chopped fiber bundle sheet formed as mentioned above is substantially the same. The state where the arranging directions of the reinforcing fibers of each chopped fiber bundle are substantially the same refers to a state in which, when the average of the arranging directions of the reinforcing fibers contained in the chopped fiber bundle is taken as the representative arranging direction of the reinforcing fibers in the chopped fiber bundle, those chopped fiber bundles in the chopped fiber bundle aggregate with their representative arranging directions staying within ±10% account for 90% or more of the total chopped fiber bundles in the aggregate of chopped fiber bundles.

In production method of molding material, the chopped fiber bundles may also be scattered on the molding base such that the arranging direction of the respective reinforcing fibers of the large number of chopped fiber bundles on the molding base is made random.

It is preferable that the molding base is a resin sheet formed with a matrix resin to be used when a resin molded article containing reinforcing fibers is produced.

The chopped fiber bundle scattering step may comprise:
(a) a first layer forming step in which the molding base has a three dimensionally shaped surface, and the chopped fiber bundles are scattered on the three dimensionally shaped surface in such a manner that the reinforcing fibers of the large number of chopped fiber bundles on the three dimensionally shaped surface are arranged in the same direction, to form a first chopped fiber bundle layer comprising a large number of chopped fiber bundles, and
(b) a second layer forming step in which the chopped fiber bundles are scattered on the first chopped fiber bundle layer in such a manner that the reinforcing fibers of the large number of chopped fiber bundles on the first chopped fiber bundle layer formed in the first layer forming step are arranged in the same direction, and also that the reinforcing fibers are arranged in a different direction from the reinforcing fibers in the chopped fiber bundles in the first chopped fiber bundle layer, to form a second chopped fiber bundle layer comprising a large number of chopped fiber bundles.

It is no problem if the arranging directions of the respective reinforcing fibers of the large number of chopped fiber bundles is substantially the same. The state where the arranging directions of the reinforcing fibers of each chopped fiber bundle are substantially the same refers to a state in which, when the average value of the arranging directions of the reinforcing fiber contained in the chopped fiber bundle is taken as the representative arranging direction of the reinforcing fibers in the chopped fiber bundle, those chopped fiber bundles in the chopped fiber bundle aggregate with their representative arranging directions staying within ±10% account for 90% or more of the total chopped fiber bundles in the aggregate of chopped fiber bundles.

Another example of the production method of molding material comprises:
(a) a chopped fiber bundle scattering step in which a large number of chopped fiber bundles are scattered on a molding base comprising a first resin sheet formed from a matrix resin to be used to produce a resin molded material containing reinforcing fibers,
(b) a resin sheet laminating step in which a second resin sheet comprising the matrix resin is laminated on the large number of chopped fiber bundles of the first resin sheet having the large number of chopped fiber bundles obtained in the chopped fiber bundle scattering step, and,
(c) an aggregate of chopped fiber bundles forming step in which a laminate comprising the large number of chopped fiber bundles obtained in the resin sheet laminating step and the first and second resin sheets are pressurized and/or heated, to combine the large number of chopped fiber bundles and the first and second resin sheets, to form an aggregate of chopped fiber bundles.

Still another example of the production method of molding material comprises a kneading step in which a large number of chopped fiber bundles and a thermoplastic resin are kneaded, to prepare a kneaded substance of the chopped fiber bundles and the thermoplastic resin and a molding step in which the kneaded substance prepared by the kneading step is continuously extruded in forms of rod or sheet, to form a continuous molded product having a rod or sheet shape, and a pelletizing step in which the continuous molded product obtained in the molding step is cut at an interval in longitudinal direction, to form pellets for injection molding.

A production method of a fiber reinforced plastic comprises one sheet or plural sheets of molding material which has an area smaller than projected area of a cavity of a mold are placed in the cavity in a state thicker than the cavity, the mold is clamped, and by pressurizing or by pressurizing and heating the molding material, the molding material is extended to fill the cavity with the molding material and, after finishing molding of fiber reinforced plastic in the cavity, the molded fiber reinforced plastic is taken out from the cavity.

The continuous reinforcing fiber is referred to, unless otherwise stated, a reinforcing fiber having a fiber length exceeding 100 mm. The continuous reinforcing fiber bundle comprises a large number of this continuous reinforcing fibers arranged in a state of bundle.

We thus provide a chopped fiber bundle which has, in the case where it is used as a molding material, good flowability and conformability, and exhibits, in the case where it is made into a fiber reinforced plastic, excellent mechanical property, and a production method thereof. Also, a molding material and a fiber reinforced plastic in which the chopped fiber bundle is used and a production method thereof are provided.

REFERENCE NUMBERS LIST

Figure 1:
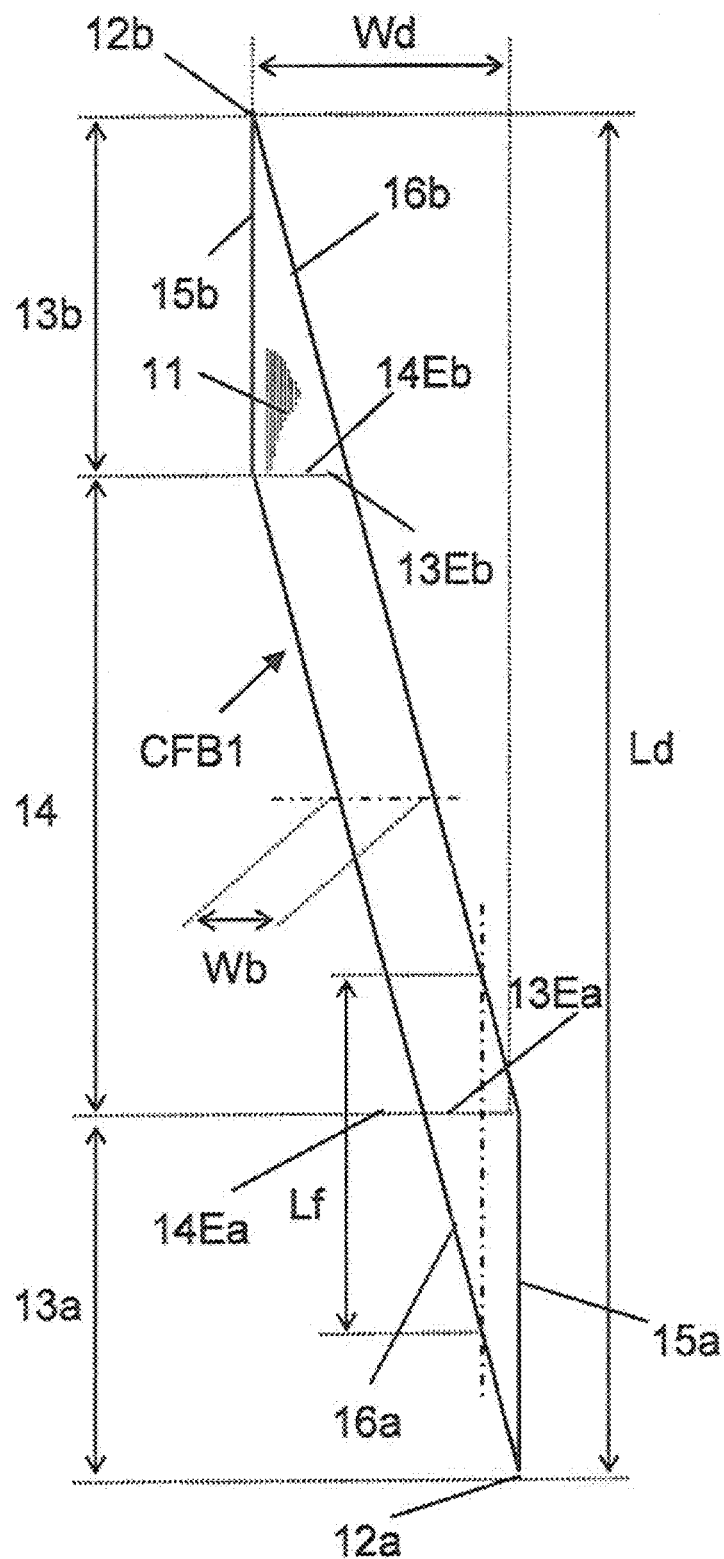
FIG. 1 is a plan view of an example of a chopped fiber bundle.

11: reinforcing fiber
12$a$: first tip
12$b$: second tip
13$a$: first transition section
13$b$: second transition section
13E$a$: first terminal end face of transition section
13E$b$: second terminal end face of transition section
14: constant section
14E$a$: one end face of constant section
15$a$: one side of first transition section
15$b$: one side of second transition section
16$a$: another side of first transition section
16$b$: another side of second transition section
61: reinforcing fiber of conventional chopped fiber bundle
61$a$, 61$b$: tips of conventional chopped fiber bundle
91: molding material
101: continuous reinforcing fiber bundle
102: bobbin
103, 104: guide rollers
105: roller cutter
106: bundling agent feeding device
107: bundling agent supply port
108: slit nozzle
109: molding base
110: robot arm
111: fiber reinforced plastic
112: cross-section of fiber reinforced plastic
113: reinforcing fiber in the fiber reinforced plastic
114: chopped fiber bundle in the fiber reinforced plastic
115: tip portion of chopped fiber bundle in the fiber reinforced plastic
121: conventional fiber reinforced plastic
122: cross-section of conventional fiber reinforced plastic
123: reinforcing fiber in conventional fiber reinforced plastic
124: chopped fiber bundle in conventional fiber reinforced plastic
125: tip portion of chopped fiber bundle in conventional fiber reinforced plastic
126: resin puddle in conventional fiber reinforced plastic
CFB, CFB1, CFB2, CFB3, CFB5$a$-CFB5$g$: chopped fiber bundle
CFBC: conventional chopped fiber bundle
CFTS: change of total cross-sectional area of reinforcing fibers
Ld: length across the chopped fiber bundle
Lf: fiber length of reinforcing fiber
Tb: largest thickness of chopped fiber bundle
Wb: largest width of chopped fiber bundle
Wd: width across the chopped fiber bundle

DETAILED DESCRIPTION

Selected representative examples of the chopped fiber bundle are explained with reference to the drawings.

FIG. 1 is a plan view of one example of the chopped fiber bundle. In FIG. 1, a chopped fiber bundle CFB1 comprises a multiplicity or a large number of unidirectionally arranged reinforcing fibers 11 and a bundling agent (not shown in Fig.) which bundles the large number of reinforcing fibers 11. One way to determine a large or appropriate number is to look to a number of carbon fibers such as in the range of about 1,000 to 700,00, for example, as described below. The fiber length Lf of the each reinforcing fiber 11 is 5 to 100 mm.

The chopped fiber bundle CFB1 has a first transition section 13$a$ in which the number of the reinforcing fibers 11 in the fiber bundle cross-section perpendicular to the arranging direction of the reinforcing fibers 11 increases from the first tip 12$a$ which is one of the tips in the arranging direction of the reinforcing fibers 11 toward the second tip 12$b$ which is the other tip and also has a second transition section 13$b$ in which the number of the reinforcing fibers 11 in the fiber bundle cross-section increases from the second tip 12$b$ toward the first tip 12$a$.

The arranging direction of the reinforcing fiber 11 is drawn, in FIG. 1, as the up and down direction or vertical direction. The arranging direction of the reinforcing fiber 11 is also the longitudinal direction of the chopped fiber bundle CFB1. The perpendicular direction to the arranging direction of the reinforcing fiber 11 is drawn, in FIG. 1, as the left and right direction or horizontal direction. The perpendicular direction to the arranging direction of the reinforcing fiber 11 is also the width direction of the chopped fiber bundle CFB1.

Between the first transition section 13$a$ and the second transition section 13$b$, there is a constant section 14, in which the number of the reinforcing fibers 11 in the fiber bundle cross-section is constant, along the arranging direction of the reinforcing fiber 11. The one end face 14E$a$ of the constant section 14 agrees with the first terminal end face 13E$a$ which is the terminal end opposite to the first tip 12$a$ of the first transition section 13$a$. Also, the other end face 14Eb of the constant section 14 agrees with the second terminal end face 13E$b$ which is the terminal end opposite to the second tip 12$b$ of the second transition section 13$b$.

In the chopped fiber bundle CFB1, between the first tip 12$a$ and the second tip 12$b$, change of a total cross-sectional area of the reinforcing fibers in the fiber bundle cross-section is made into 0.05 mm² or less per 1 mm along the arranging direction of the reinforcing fiber 11.

FIG. 1 is a plan view of a state in which a width of the chopped fiber bundle CFB1 in perpendicular direction to the arranging direction of the reinforcing fiber 11 becomes the largest. The chopped fiber bundle CFB1 has, in entire area of the constant section 14, the largest width Wb. In the position (section) having the largest width Wb, the number of the reinforcing fibers 11 becomes the largest.

In FIG. 1, in outer shape of both transition sections of the first transition section 13a and the second transition section 13b, the respective sides 15a and 15b of one side from the tip toward the terminal end are formed with straight segment along the arranging direction of the reinforcing fiber 11, and the respective sides 16a and 16b of other side are formed with straight segment along which the cut tip portions of the large number of reinforcing fibers 11 which are cut when the chopped fiber bundle CFB1 was produced are lined.

The distance in width direction of the chopped fiber bundle CFB1 between the side 15a and the side 15b of the chopped fiber bundle CFB1 is shown with an across width Wd of the chopped fiber bundle CFB1 and the distance in length direction of the chopped fiber bundle CFB1 between the first tip 12a and the second tip 12b is shown with an across length Ld of the chopped fiber bundle CFB1.

Figure 2:
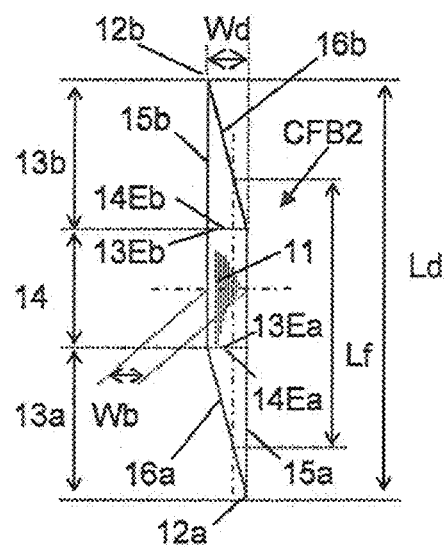
FIG. 2 is a plan view of another example of a chopped fiber bundle.

FIG. 2 is a plan view of another example of the chopped fiber bundle. In FIG. 2, a chopped fiber bundle CFB2 has the same configuration as the chopped fiber bundle CFB1 of FIG. 1. Accordingly, in each portion of the chopped fiber bundle CFB2 of FIG. 2, the same reference number as the reference number of the corresponding portion of the chopped fiber bundle CFB1 of FIG. 1 is given.

The difference between the chopped fiber bundle CFB2 of FIG. 2 and the chopped fiber bundle CFB1 of FIG. 1 is the width Wb of chopped fiber bundle in the constant section 14 of the chopped fiber bundle CFB2 of FIG. 2, that is, an across width Wd of the chopped fiber bundle CFB2 is narrow compared to the across width Wd of the chopped fiber bundle CFB1 of FIG. 1. As a result, the length of the side 16a along which cut tip portions of the large number of reinforcing fibers 11 are lined in the first transition section 13a of the chopped fiber bundle CFB2 of FIG. 2 is shorter than the length of the side 16a of the chopped fiber bundle CFB1 of FIG. 1, and the length of the side 16b along which the cut tip portions of the large number of reinforcing fibers 11 are lined in the second transition section 13b of the chopped fiber bundle CFB2 of FIG. 2 is shorter than the length of the side 16b of the chopped fiber bundle CFB1 of FIG. 1.

The fiber length Lf of each reinforcing fiber 11 in the chopped fiber bundle CFB2 is 5 to 100 mm. In the chopped fiber bundle CFB2, between the first tip 12a and the second tip 12b, the change of total cross-sectional area of the reinforcing fibers in the fiber bundle cross-section is 0.05 mm² or less per 1 mm in arranging direction of the reinforcing fiber 11.

Figure 3:
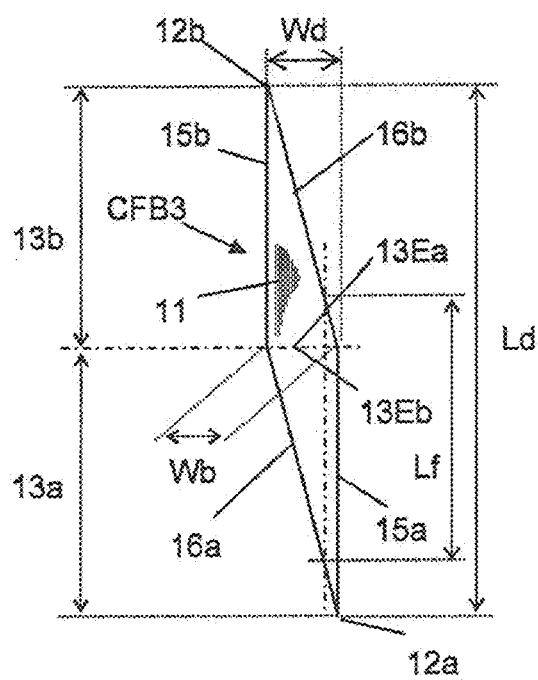
FIG. 3 is a plan view of still another example of a chopped fiber bundle.

FIG. 3 is a plan view of still another example of the chopped fiber bundle. In FIG. 3, the chopped fiber bundle CFB3 has the same configuration as the chopped fiber bundle CFB1 of FIG. 1 except it has not the constant section 14 of the chopped fiber bundle CFB 1 of FIG. 1. Accordingly, to the each portion of the chopped fiber bundle CFB3 of FIG. 3, the same reference number as the reference number of the corresponding portion of the chopped fiber bundle CFB1 of FIG. 1 is given.

The chopped fiber bundle CFB3 of FIG. 3 comprises a first transition section 13a in which the number of the reinforcing fibers 11 increases from the first tip 12a toward the second tip 12b and a second transition section 13b in which the number of the reinforcing fibers 11 increases from the second tip 12b toward the first tip 12a. In the chopped fiber bundle CFB3, the first terminal end face 13Ea which is the terminal end opposite to the first tip 12a of the first transition section 13a directly agrees with the second terminal end face 13Eb which is the terminal end opposite to the second tip 12b of the second transition section 13b.

The chopped fiber bundle CFB3 has, at the position where these both end faces 13Ea and 13Eb agree, the largest width Wb. At the position (section) where it has the largest width Wb, the number of the reinforcing fibers 11 becomes largest. Also, since these both end faces 13Ea and 13Eb agree, the value of an across length Ld of the chopped fiber bundle CFB3 is second times of the length Lf of the reinforcing fiber 11.

The fiber length Lf of each reinforcing fiber 11 in the chopped fiber bundle CFB3 is 5 to 100 mm. In the chopped fiber bundle CFB3, between the first tip 12a and the second tip 12b, the change of a total cross-sectional area of the reinforcing fibers in the fiber bundle cross-section is made into 0.05 mm² or less per 1 mm in arranging direction of the reinforcing fiber 11.

Figure 4:
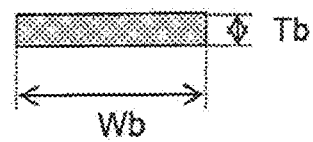
FIG. 4 is a cross sectional view at position where the width of the chopped fiber bundle of FIG. 1 has the largest width Wb.

FIG. 4 is a cross sectional view in perpendicular direction to longitudinal direction of the chopped fiber bundle CFB1 at the position where the width of the chopped fiber bundle CFB1 of FIG. 1 has the largest width Wb. In FIG. 4, the chopped fiber bundle CFB1, in which the large number of reinforcing fibers 11 are bundled by a bundling agent, has the largest width Wb in its width direction (in FIG. 4, left and right direction or horizontal direction), and has the largest thickness Tb in its thickness direction (in FIG. 4, up and down direction or vertical direction). Since the respective cross-sectional shapes at the respective positions of the largest width Wb of the chopped fiber bundle CFB2 of FIG. 2 and the chopped fiber bundle CFB3 of FIG. 3 are the same as the cross-sectional shape of the chopped fiber bundle CFB1 of FIG. 4, their drawings are omitted. By the ratio Wb/Tb of the value of largest width Wb to the value of largest thickness Tb, an aspect ratio of the chopped fiber bundle is shown.

A cross-sectional shape of the chopped fiber bundle in perpendicular direction to longitudinal direction can be various shapes such as circle, ellipse or square, but in view of stability of the cross-sectional shape of the chopped fiber bundle, good handling property of the chopped fiber bundle and easiness of production of the chopped fiber bundle, it is preferable that the cross-sectional shape of the chopped fiber bundle is circle, ellipse or square, and it is especially preferable to be rectangle as shown in FIG. 4 or flat ellipse.

Figure 5:
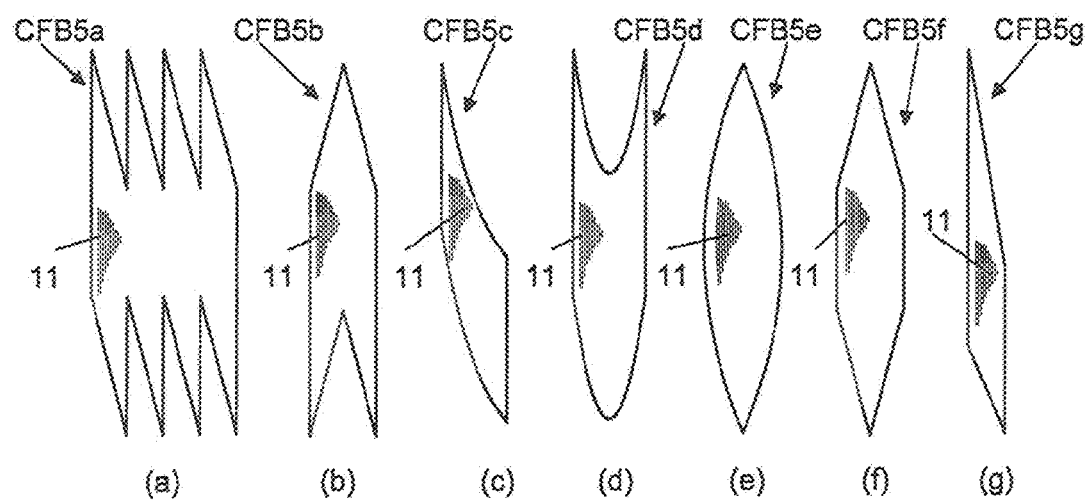
FIG. 5 is an enumeration of plan views ((a) to (g)) of the respective other seven examples of the chopped fiber bundle.

FIG. 5 is an enumeration of the respective plan views ((a) to (g)) of other 7 examples of chopped fiber bundle. The respective chopped fiber bundles of FIG. 5 is arranged up and down direction in the figure and comprises the large number of reinforcing fibers 11 bundled by a bundling agent.

A chopped fiber bundle CFB5a of FIG. 5(a) has 4 tips in upper side and 4 tips in lower side and has V-shaped incisions between the adjacent tips. Outer shape of the chopped fiber bundle CFB5a is constituted with 16 sides and all of the each side is constituted with straight segments.

A chopped fiber bundle CFB5b of FIG. 5(b) has one tip in upper side and 2 tips in lower side and has a V-shaped incision between the 2 tips in lower side. Outer shape of the chopped fiber bundle CFB5b is constituted with 6 sides and all of each side are constituted with straight segments.

A chopped fiber bundle CFB5c of FIG. 5(c) has one tip in upper side and one tip in lower side. Outer shape of the chopped fiber bundle CFB5c is constituted with 4 sides and 2 sides of them are constituted with curved segments and other 2 side are constituted with straight segments.

A chopped fiber bundle CFB5d of FIG. 5(d) has 2 tips in upper side and one tip in lower side. Outer shape of the chopped fiber bundle CFB5d is constituted with 4 sides and, among them, the side connecting the upper 2 sides is constituted with U-shaped curved segment, and the side including the lower tip is constituted with U-shaped curved segment, and other 2 sides are constituted with straight segments.

A chopped fiber bundle CFB5e of FIG. 5(e) has one tip in upper side and one tip in lower side. Outer shape of the chopped fiber bundle CFB5e is constituted with 2 sides and those sides are constituted with curved segments convex to outside connecting the upper tip and the lower tip, respectively.

A chopped fiber bundle CFB5f of FIG. 5(f) has one tip in upper side and one tip in lower side. Outer shape of the chopped fiber bundle CFB5f is constituted with 6 sides, and all of each side are constituted with straight segments.

A chopped fiber bundle CFB5g of FIG. 5(g) has one tip in upper side and one tip in lower side. Outer shape of the chopped fiber bundle CFB5g is constituted with 4 sides and all of each side are constituted with straight segments.

The chopped fiber bundle is used for production of molding material for molding a fiber reinforced molded article (fiber reinforced plastic). This molding material comprises an aggregate of a large number of chopped fiber bundles. In the case where a molded article having a complicated shape is molded by using this molding material, a good conformability to the complicated shape is required. Since all the fiber lengths Lf of the reinforcing fiber 11 contained in the chopped fiber bundle are made into 100 mm or less, the molding material comprising a large number of chopped fiber bundles has a good conformability.

In the case where the fiber length Lf exceeds 100 mm, as the fiber length becomes longer, in molding step of a molded article, the reinforcing fiber 11 becomes difficult to flow in its arranging direction, and it becomes difficult to produce a molded article having a complicated shape. In the case where the fiber length Lf is less than 5 mm, flowability of the reinforcing fiber 11 in a molding step of a molded article is improved, but mechanical characteristics of the obtained molded article lower. From the relation between flowability of reinforcing fiber in a molding step of a molded article and mechanical characteristics of a molded article, it is preferable that the length Lf of each reinforcing fiber 11 in the chopped fiber bundle is 10 to 50 mm.

It is better that the number of reinforcing fibers of less than 5 mm in fiber length contained in the chopped fiber bundle is as few as possible, and it is better to be less than 5% of the total number of reinforcing fibers constituting the chopped fiber bundle. That is, those states where the fiber length Lf of the reinforcing fibers 11 constituting the chopped fiber bundle is 5 to 100 mm includes a state in which the number of reinforcing fibers having a fiber length of less than 5 mm is 5% or less of the total number of reinforcing fibers constituting the chopped fiber bundle and, in addition, all reinforcing fibers have a fiber length of 100 mm or less.

In general, by molding a molding material comprising an aggregate of a large number of chopped fiber bundles, fiber reinforced plastic (hereafter, may be referred to as "short fiber reinforced plastic") is produced. In the case where a force is loaded to the fiber reinforced plastic, most of the force is born by reinforcing fibers present inside the fiber reinforced plastic. In the case of a chopped fiber bundle, a large number of reinforcing fibers forming the bundle are in a state in which they are cut in a certain length. Accordingly, it is necessary that a force born by reinforcing fibers of some chopped fiber bundle is, via a matrix resin, shared from the tip portion of the chopped fiber bundle to reinforcing fibers of other chopped fiber bundle, at tip portion of the chopped fiber bundle locating in vicinity.

Figure 6:
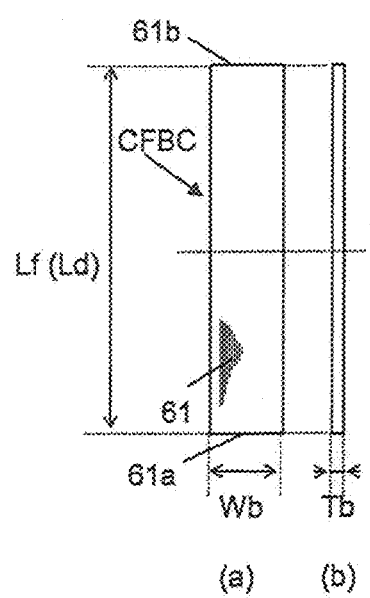
FIG. 6 is an enumeration of plan view (a) and side view (b) of an example of conventional chopped fiber bundle.

A plan view and a side view of one example of conventional chopped fiber bundle used for producing a fiber reinforced plastic are shown in FIG. 6. In FIG. 6, a conventional chopped fiber bundle CFBC comprises a large number of reinforcing fibers 61 bundled by a bundling agent. The chopped fiber bundle CFBC is produced by cutting a continuous reinforcing fiber bundle comprising a large number of continuous reinforcing fibers, at a fixed interval in longitudinal direction, in perpendicular direction to longitudinal direction of the continuous reinforcing fiber bundle. Accordingly, in both tips 61a and 61b in longitudinal direction of the chopped fiber bundle CFBC, all of cut tip portions of the large number of reinforcing fibers 61 which were cut when the chopped fiber bundle CFBC is produced locate in width direction of the chopped fiber bundle CFBC. In other words, in position of the cut tip portions of the large number of the reinforcing fibers 61, there is no shift with each other in longitudinal direction of the chopped fiber bundle CFBC.

In the case where a force is loaded to a fiber reinforced plastic comprising such a large number of conventional chopped fiber bundle CFBC, a force born by reinforcing fibers of some chopped fiber bundle is shared from the tip portion of the chopped fiber bundle, via a matrix resin, to other chopped fiber bundle locating in vicinity. In particular, in the case where reinforcing fibers of the chopped fiber bundle are arranged in direction to which the force is loaded on the fiber reinforced plastic, since the chopped fiber bundle bears a big force, the big force is shared from the tip portion of the chopped fiber bundle to a chopped fiber bundle locating in vicinity. At that time, in the conventional chopped fiber bundle CFBC, all tip portions of the large number of the reinforcing fibers are lined up in width direction (in FIG. 6, left and right direction or horizontal direction) of the chopped fiber bundle CFBC, sharing of the force between chopped fiber bundles via a matrix resin arises immediately. In such a state of sharing of force, a stress concentration is generated to tip portion of the chopped fiber bundle CFBC. By this stress concentration, tip portion of the chopped fiber bundle CFBC is broken to generate a crack. By several cracks generated being linked, it also arises that the fiber reinforced plastic is broken as a whole.

To improve strength of short fiber reinforced plastic, as proposed in the above-mentioned JP 62-048730 A and JP 01-163218 A, it is effective to decrease number of reinforcing fibers contained in chopped fiber bundle. By decreasing number of reinforcing fibers, since force to be shared from tip portion of some chopped fiber bundle to a tip portion of chopped fiber bundle in its vicinity becomes small, influence of the stress concentration becomes small. For that reason, even when a crack is generated, a linkage of cracks is hard to arise and, as a result, strength of fiber reinforced plastic is improved.

However, it is industrially very difficult to decrease number of reinforcing fibers contained in a chopped fiber bundle. In the case where glass fiber is used as a reinforcing fiber, to improve strength, continuous glass fiber bundle comprising a large number of continuous glass fibers is separated into fibers and after separating the number of glass fibers into small groups, by cutting the fiber bundle, a chopped fiber bundle of which number of glass fiber is small is produced. However, since the step of separating the fibers becomes necessary, there is a problem that production cost of the chopped fiber bundle increases. Further, in the case where carbon fiber is used as a reinforcing fiber, since fluff is generated when carbon fiber bundle is separated into fibers, it is difficult to separate carbon fiber bundle into small groups.

On the other hand, in the case where each reinforcing fiber of the large number of reinforcing fibers is arranged by dispersing in monofilament unit, since flexural rigidity of each reinforcing fiber is low, it is very difficult to disperse while keeping straightness of reinforcing fiber and the reinforcing fibers aggregate with each other to lower strength as a result, it is difficult to industrially produce a molding material in which reinforcing fibers are dispersed as monofilament.

The chopped fiber bundle solves the above-mentioned problem. By decreasing number of reinforcing fibers constituting the chopped fiber bundle at both tip portions of the chopped fiber bundle than its center portion, the chopped fiber bundle shares a force, born by the chopped fiber bundle, which is the largest at center of the chopped fiber bundle, via reinforcing fibers of which number is decreasing toward the tip portion of the chopped fiber bundle, little by little, to a chopped fiber bundle locating in its vicinity. Accordingly, in a fiber reinforced plastic comprising the chopped fiber bundle, the above-mentioned stress concentration is hard to be generated.

For that reason, compared to a conventional chopped fiber bundle in which all reinforcing fibers are cut in the same position, in the case of our chopped fiber bundle, strength of fiber reinforced plastic to be obtained is improved significantly. Not only that, since a stress concentration is not generated, damage (crack) in initial stage is hard to be generated. In fiber reinforced plastic applications, there are also uses which cannot be applied due to a sound by damage in initial stage to cause an unease, but for such uses also, it becomes possible to use a fiber reinforced plastic (fiber reinforced plastic) comprising chopped fiber bundle. Also, damage in initial stage greatly affects to fatigue strength, but in the case of fiber reinforced plastic, since damage in initial stage is small, not only static strength but also fatigue strength is greatly improved.

Regarding the increase of number of the reinforcing fibers 11 at the transition sections 13a and 13b of the chopped fiber bundle, there is increase of number of the reinforcing fibers 11 at least 2 positions in the transition sections 13a and 13b, and in the case where the maximum value of total cross-sectional area of the reinforcing fiber in cross-section of the chopped fiber bundle at the position where the number increases is 0.008 mm$^2$ or less, the increase of number of the reinforcing fibers 11 in the transition sections 13a and 13b can be said to be a continuous increase. In view point that, when the number of reinforcing fibers increases more smoothly, the above-mentioned stress concentration is harder to be generated, it is preferable that total cross-sectional area of reinforcing fibers in cross-section of chopped fiber bundle of the above-mentioned position where the number increases is 0.002 mm$^2$ or less.

Across the whole area of longitudinal direction (over the total region of the across length Ld of the chopped fiber bundle) of the chopped fiber bundle containing the transition sections 13a and 13b in which change of number of the reinforcing fibers 11 actually occurs, the change of total cross-sectional area of reinforcing fibers is made into 0.05 mm$^2$ or less per 1 mm. By this limitation of change, the above-mentioned stress concentration can effectively be prevented. It is preferable that this change is 0.04 mm$^2$ or less per 1 mm, and to be 0.025 mm$^2$ or less is more preferable.

The total cross-sectional area of reinforcing fibers at an arbitrary position in the chopped fiber bundle is, in the arbitrary position, the total sum obtainable by addition of cross-sectional area of each reinforcing fiber of all reinforcing fibers present in the plane perpendicular to the arranging direction of reinforcing fiber (cross-section).

Figure 7:
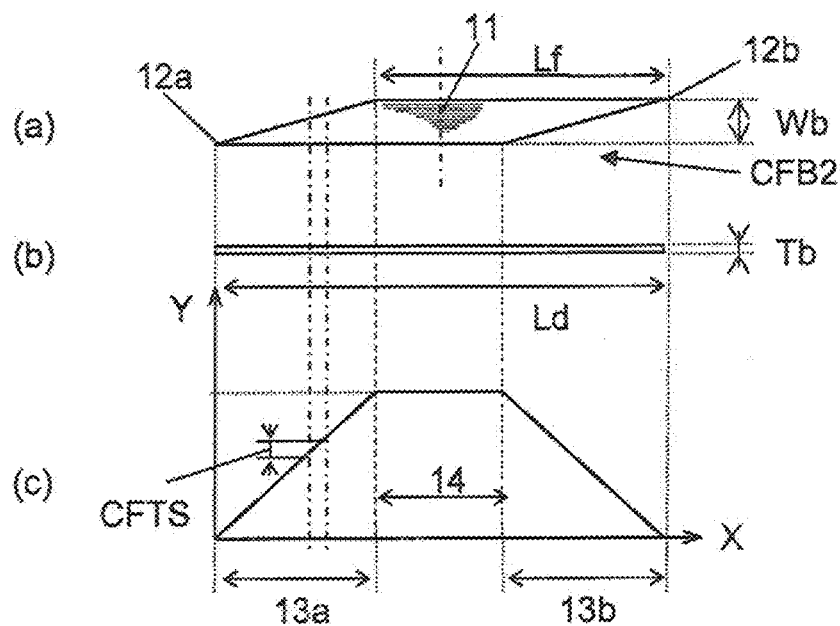
FIG. 7 is an enumeration of plan view (a) and side view (b) of the chopped fiber bundle of FIG. 2, and graph (c) which shows change of number of reinforcing fibers in arranging direction of the reinforcing fiber of the chopped fiber bundle.

FIG. 7 is a plan view (a) and a side view (b) of the chopped fiber bundle CFB2 of FIG. 2, and a graph (c) showing change of a number of the reinforcing fibers 11 in arranging direction of the reinforcing fiber 11 of the chopped fiber bundle CFB2. In the graph of FIG. 7(c), the horizontal axis X denotes a position in the across length Ld of the chopped fiber bundle CFB2, and the vertical axis Y denotes a number of the reinforcing fibers 11 or a total cross-sectional area of the reinforcing fibers 11.

As shown in the graph of FIG. 7(c), the number of the reinforcing fibers 11 of the chopped fiber bundle CFB2 continuously increases, from the first tip 12a toward the first terminal end face 13Ea of first transition section, along longitudinal direction of the chopped fiber bundle CFB2, and reaches a constant value at the first terminal end face 13Ea. This constant value is maintained in the constant section 14 from the first terminal end face 13Ea toward the second terminal end face 13Eb of the second transition section. Next, the number of the reinforcing fibers 11 continuously decreases, from the second terminal end face 13Eb toward the second tip 12b, along longitudinal direction of the chopped fiber bundle CFB2. The number of reinforcing fibers 11 in the constant section 14 is the maximum value of the number of reinforcing fibers 11 in the chopped fiber bundle CFB2.

Figure 8:
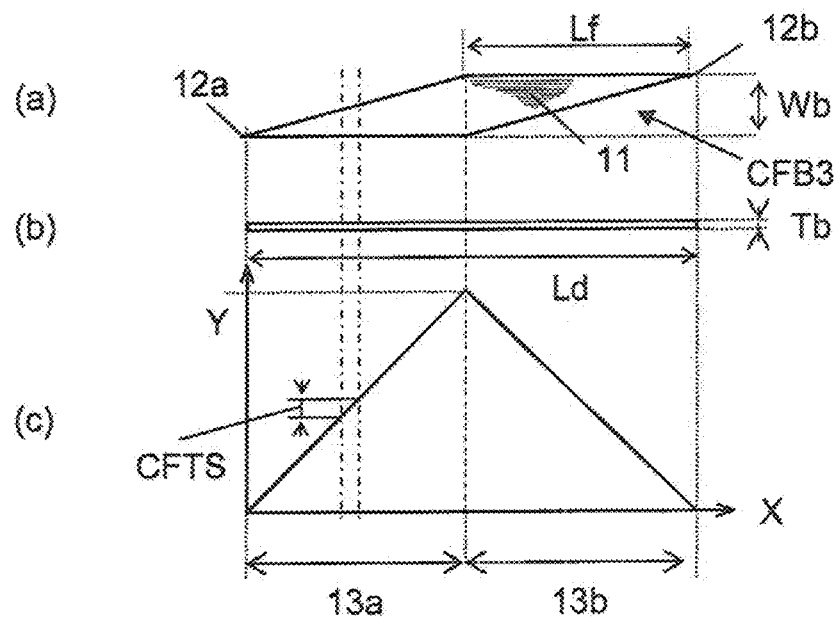
FIG. 8 is an enumeration of plan view (a) and side view (b) of the chopped fiber bundle of FIG. 3, and graph (c) which shows change of number of reinforcing fibers in arranging direction of the reinforcing fiber of the chopped fiber bundle.

FIG. 8 is a plan view (a) and a side view (b) of the chopped fiber bundle CFB3 of FIG. 3 and a graph (c) showing change of a number of reinforcing fibers 11 in arranging direction of the reinforcing fiber 11 of the chopped fiber bundle CFB3. In the graph of FIG. 8(c), the horizontal axis X denotes a position in the across length Ld of the chopped fiber bundle CFB3, and the vertical axis Y denotes a number of the reinforcing fibers 11 or a total cross-sectional area of the reinforcing fiber 11.

As shown in the graph of FIG. 8(c), the number of the reinforcing fibers 11 of the chopped fiber bundle CFB3 continuously increases, from the first tip 12a toward the first terminal end face 13Ea of the first transition section, along longitudinal direction of the chopped fiber bundle CFB3. The chopped fiber bundle CFB3 does not have a constant section in which the number of reinforcing fibers is maintained in a constant value in longitudinal direction of the fiber bundle, and since the first terminal end face 13Ea agrees with the second terminal end face 13Eb of the second transition section 13b, the number of the reinforcing fibers 11 in the first terminal end face 13Ea (the second terminal end face 13Eb) shows the maximum value. Next, the number of the reinforcing fibers 11 continuously decreases, from the second terminal end face 13Eb toward the second tip 12b, along longitudinal direction of the chopped fiber bundle CFB3.

Forms of change of the number of reinforcing fibers in the longitudinal direction of chopped fiber bundle are two, the first form in which after increasing, the number reaches a constant value and then decreases and the second form in which after increasing, the number decreases without having a constant values.

The change CFTS of the total cross-sectional area FTS of the reinforcing fiber 11 in cross-section of the chopped fiber bundle between the first tip 12a and the second tip 12b is 0.05 mm$^2$ or less per 1 mm in arranging direction of the reinforcing fiber 11. The total cross-sectional area FTS of the reinforcing fiber 11 in cross-section of the chopped fiber bundle is the total sum of the cross-sectional areas of the each reinforcing fiber 11 present in the cross-section.

In the case where the cross-sectional area of each reinforcing fiber 11 present in cross-section of the chopped fiber bundle has a dispersion of ±10% or less with respect to cross-sectional area of a representative reinforcing fiber selected therefrom, as the total cross-sectional area FTS of the reinforcing fiber 11, the value obtainable by multiplying number of the reinforcing fibers 11 present in the cross-section by cross-sectional area of the above-mentioned representative reinforcing fiber is used. Also, in the case where the largest width Wb of chopped fiber bundle is less than 3 mm, as the change CFTS of the total cross-sectional area FTS of the reinforcing fiber, the value obtainable by dividing the maximum value of the total cross-sectional area FTS of the reinforcing fiber 11 in the chopped fiber bundle by the length of the transition section 13a or 13b (mm) in arranging direction of the reinforcing fiber is used.

Various examples of chopped fiber bundles are shown in FIGS. 1 to 5. All of these chopped fiber bundles have a transition section in which a number of reinforcing fibers increases and, in addition, across whole area of longitudinal direction of the chopped fiber bundle, the change of a total cross-sectional area of reinforcing fibers is 0.05 mm$^2$ or less per 1 mm in arranging direction of the reinforcing fiber. It is preferable that, in the chopped fiber bundle, the maximum value of the total cross-sectional area of the reinforcing fibers is 0.1 mm$^2$ or more.

The state in which the number of reinforcing fibers increases from the tip toward the terminal end of transition section in the chopped fiber bundle can be expressed, on the contrary, as a state in which the number of reinforcing fibers decreases from the center portion toward the tip of the chopped fiber bundle. By this state of decrease of the number of reinforcing fibers, generation of stress concentration in the above-mentioned fiber reinforced plastic is prevented. As such a state of decrease of the number of reinforcing fibers, a configuration in which the number of reinforcing fibers gradually, that is, continuously decreases is preferable. As the chopped fiber bundle becomes thicker and the number of reinforcing fibers becomes larger and the total cross-sectional area of the reinforcing fibers becomes larger, the effect of preventing a generation of stress concentration becomes bigger. The larger the total cross-sectional area of the reinforcing fibers, the larger the force born by one chopped fiber bundle in fiber reinforced plastic becomes, but even the force is large, the state in which the force is shared immediately to adjacent tip portion of chopped fiber bundle, via matrix resin, is prevented by the state of decrease of the number of reinforcing fibers in the transition section. That is, a transmission of force between adjacent chopped fiber bundles is gradually effected by the state of decrease of the number of reinforcing fibers in the transition section, to prevent a stress concentration in tip portion of the chopped fiber bundle.

In the case where a chopped fiber bundle is produced, it is more excellent in processability if a thicker chopped fiber bundle is produced, and production cost also becomes low. However, in the case where the conventional chopped fiber bundle of the shape explained by FIG. 6 is made into a thick chopped fiber bundle, conventional short fiber reinforced plastic molded with this thick chopped fiber bundle is low in strength. Accordingly, there was a problem that such a short fiber reinforced plastic was hard to use for a high strength member.

In our chopped fiber bundle, even if it is a thick chopped fiber bundle, a short fiber reinforced plastic molded with that bundle has, compared to conventional short fiber reinforced plastic molded with conventional thick chopped fiber bundle, a higher strength. Accordingly, not only it becomes possible to reduce production cost of the chopped fiber bundle, but also it becomes possible to produce short fiber reinforced plastics having a high strength. In view point of the thick chopped fiber bundle, it is preferable that the maximum value of total cross-sectional area of the reinforcing fibers is 0.2 mm$^2$ or more. In view of degree of the freedom of thickness design when it is made into a fiber reinforced plastic, it is preferable that the maximum value of total cross-sectional area of the reinforcing fibers is 30 mm$^2$ or less, and to be 5 mm$^2$ or less is more preferable.

On the other hand, in the case where the maximum value of total cross-sectional area of the reinforcing fibers is less than 0.1 mm$^2$, it is preferable that, across whole area of the chopped fiber bundle, change of number of the reinforcing fibers per 1 mm in arranging direction of the reinforcing fiber is 30% or less of the maximum number of the reinforcing fibers (maximum value of numbers). In the case where the maximum value of total cross-sectional area of the reinforcing fibers is less than 0.1 mm$^2$, that is, even it is a thin chopped fiber bundle, rather than the force is released immediately like a conventional chopped fiber bundle, a configuration in which number of reinforcing fibers gradually decreases from the center portion of the chopped fiber bundle toward the tip, is preferable since a transmission of force in fiber reinforced plastic is gradually done.

In the chopped fiber bundle, it is preferable that the fiber length Lf of the each reinforcing fiber 11 is the same. When a chopped fiber bundle is produced, if each fiber length of reinforcing fibers is the same, production efficiency of the chopped fiber bundle is high since it is possible to produce a chopped fiber bundle by cutting a continuous reinforcing fiber bundle in longitudinal direction in a same interval and, when a large number of chopped fiber bundles are integrated to prepare a molding material, and a molded article is molded by using this molding material, it is easier to control flowability of the reinforcing fiber when each fiber length of the reinforcing fibers is the same. Examples of the chopped fiber bundle in which each fiber length of reinforcing fibers is the same are shown in FIGS. 1, 2, 3, 5(a), 5(b), 5(c) and 5(d).

The state where the fiber lengths of the reinforcing fibers are the same refers to a state in which the reinforcing fibers having a fiber length within ±5% from the average value of the fiber lengths of the reinforcing fibers contained in the chopped fiber bundle account for 95% of all reinforcing fibers contained in the chopped fiber bundle.

As the reinforcing fiber used for the chopped fiber bundle, for example, organic fibers such as aramid fiber, polyethylene fiber or poly-p-phenylene benzoxazole (PBO) fiber, inorganic fibers such as glass fiber, carbon fiber, silicon carbide fiber, alumina fiber, Tyranno fiber, basalt fiber or ceramics fiber, metal fibers such as stainless steel fiber or steel fiber, and other than that, boron fiber, natural fiber and modified natural fiber are mentioned. Also, it may be a combination of two or more different kind reinforcing fibers. Among these, since carbon fiber is light in weight, has excellent specific strength and specific modulus, and further, has excellent heat resistance and chemical resistance, it is preferably used as a reinforcing fiber. Molded article (fiber reinforced plastic) produced from the chopped fiber bundle comprising carbon fibers is preferably used for members of such as automobile panel in which decreasing weight is desired.

It is preferable that the reinforcing fiber is carbon fiber, that the number of carbon fibers is 1,000 to 700,000 fibers and that, across whole area of the chopped fiber bundle, change of number of carbon fibers in each 1 mm movement in arranging direction of the carbon fiber is 1,400 fibers or less.

As a carbon fiber, polyacrylonitrile-based carbon fiber by which a high strength can easily be obtained is preferable. In consideration that monofilament diameter of easily available carbon fiber is about 5 to 10 μm, it is preferable that the number of carbon fibers in the chopped fiber bundle is 1,000 to 700,000 fibers. It is more preferable that the number of carbon fibers is 3,000 to 100,000 fibers. Since a continuous carbon fiber bundle having a high strength and has a number of fibers of 6,000 to 50,000 fibers is cheap and, in addition, easily available, it is preferably used when the chopped fiber bundle is produced.

When the change of number of the reinforcing fibers in each 1 mm movement in arranging direction of the reinforcing fiber is 1,400 fibers or less across whole area of the chopped fiber bundle, it is possible to effectively prevent stress concentration in a fiber reinforced plastic. It is preferable that the change of number of reinforcing fibers is 1,000 fibers or less. To improve strength of fiber reinforced plastic, it is preferable that the change of number of reinforcing fibers is 600 fibers or less.

In the case where the largest width Wb of chopped fiber bundle is less than 3 mm, as the change of number of reinforcing fibers, a value proportionally converted to the change per 1 mm by dividing maximum value of number of the reinforcing fibers of the chopped fiber bundle by length of the transition section in arranging direction of the reinforcing fiber is used. At this time, it is preferable that there are increases of the number of reinforcing fibers at least 2 positions in the transition section, and number of reinforcing fibers contained in cross-section of the chopped fiber bundle at the position where the number of reinforcing fibers increases is 200 fibers or less, and to be 50 fibers or less is more preferable.

It is preferable that the ratio Wb/Tb of the largest width Wb to the largest thickness Tb is 20 to 400. The ratio Wb/Tb denotes an aspect ratio of the chopped fiber bundle. The greater the aspect ratio is, the more flat the chopped fiber bundle is. A flat chopped fiber bundle brings about increase of strength of the fiber reinforced plastic. It is preferable that the value of the largest thickness Tb is 150 μm or less, and to be 100 μm or less is more preferable.

The flat chopped fiber bundle can be produced, for example, by cutting unidirectionally drawn out continuous reinforcing fiber bundle after opening. This opening of the continuous reinforcing fiber bundle can be done, for example, by passing the continuous reinforcing fiber bundle while contacting with a roller, or by vibrating the continuous reinforcing fiber bundle, or by air-blowing the continuous reinforcing fiber bundle.

Especially preferable configuration of the chopped fiber bundle is a configuration in which tip portion of the chopped fiber bundle has a side oblique with respect to the arranging direction of reinforcing fiber. A configuration in which the oblique side is formed in straight line having an angle of 2 to 30° with respect to the arranging direction of reinforcing fiber is more preferable.

A chopped fiber bundle having such a configuration can be produced, for example, by unidirectionally drawing out continuous reinforcing fiber bundle and by cutting the drawn out continuous reinforcing fiber bundle in a straight line of an angle of 2 to 30° with respect to the arranging direction of reinforcing fiber (drawing out direction of continuous reinforcing fiber bundle) such that fiber length of reinforcing fiber is made into 5 to 100 mm. In this production method, a more flat chopped fiber bundle can be produced by cutting the unidirectionally drawn out continuous reinforcing fiber bundle after opening. Although conventional chopped fiber bundle was produced by cutting the continuous reinforcing fiber bundle in perpendicular direction to the arranging direction of reinforcing fiber (drawing out direction of continuous reinforcing fiber bundle), the chopped fiber bundle which is capable of producing a fiber reinforced plastic having a high strength can be obtained by only cutting a continuous reinforcing fiber bundle in an angle of 2 to 30° with respect to the arranging direction of reinforcing fiber (drawing out direction of continuous reinforcing fiber bundle).

The smaller the angle of the side formed by the arrangement of the cut reinforcing fibers in tip portion of the chopped fiber bundle with respect to the arranging direction of reinforcing fiber, the more effect of increasing strength of fiber reinforced plastic made by using this bundle can be obtained. In the case of an angle of 30° or less, its effect is significant. However, on the other hand, handling property of the chopped fiber bundle itself lowers. Further, the smaller the angle of the arranging direction of reinforcing fiber with the cutting blade, stability in the cutting step lowers more. For that reason, it is preferable that the angle is 2° or more. It is more preferable that the angle is 3 to 25°. In view of balance between increasing strength of the fiber reinforced plastic and processability in production process of the chopped fiber bundle, it is more preferable that the angle is 5 to 15°. The angle mentioned here is expressed in an absolute value.

The chopped fiber bundles shown in FIGS. 1, 2 and 3 are produced by cutting a continuous reinforcing fiber bundle at a same cutting interval in its longitudinal direction. The chopped fiber bundle CFB1 of FIG. 1 is obtained by cutting a continuous reinforcing fiber bundle of relatively large width, and has a configuration in which lengths of the sides 16*a* and 16*b*, along which the cut ends of the reinforcing fiber 11 are lined, are long. Since the length of the sides 16*a* and 16*b* are long, at producing a molding material, or, at molding a molded article using the molding material, reinforcing fibers are apt to be opened. For that reason, thickness of each chopped fiber bundle in molding material or molded article becomes thin and strength of molded article (fiber reinforced plastic) to be obtained is easy to be improved.

The chopped fiber bundle CFB2 of FIG. 2 is obtained by cutting a continuous reinforcing fiber bundle of relatively narrow width, and has a configuration in which lengths of the sides 16*a*, 16*b*, along which cut ends of the reinforcing fiber 11 are lined, are short. Since the lengths of sides 16*a*, 156*b* are short, the reinforcing fibers are hard to be broken to pieces, and it is excellent in handling property of chopped fiber bundle.

The chopped fiber bundle CFB3 of FIG. 3 does not have, due to the relation between cutting angle when the continuous reinforcing fiber bundle is cut and the width of the continuous reinforcing fiber bundle, a constant section which is present in the chopped fiber bundle of FIG. 1 or FIG. 2, and it comprises only two transition sections 13*a* and 13*b*. In this chopped fiber bundle CFB3, the across length Ld of the chopped fiber bundle CFB3 becomes 2 times of the fiber length Lf of the reinforcing fiber 11.

As cutting means of the continuous reinforcing fiber bundle for producing the chopped fiber bundle, for example, there are rotary cutters such as a guillotine cutter or a roving cutter. The continuous reinforcing fiber bundle is inserted into the cutting means, in a condition in which longitudinal direction of the continuous reinforcing fiber bundle and direction of cutting blade provided to the cutting means cross relatively obliquely, and it is cut.

For production of the chopped fiber bundle CFB5*a* of FIG. 5(*a*), a jagged blade, for production of the chopped fiber bundle CFB5*b* of FIG. 5(*b*), V-shaped blade, for production of the chopped fiber bundle CFB5c of FIG. 5(c), stream lined blade and for production of the chopped fiber bundle CFB5d of FIG. 5(d), U-shaped blade is used. The chopped fiber bundle CFB5e of FIG. 5(e) is made by cutting continuous reinforcing fiber bundle in oblique direction with respect to the longitudinal direction of continuous reinforcing fiber bundle while imparting a bundling agent such as water to the continuous reinforcing fiber bundle, and by converging both side portion of longitudinal direction of the cut piece obtained by the cutting in a canoe-lie form toward both tip portions. For productions of the chopped fiber bundle CFB5f of FIG. 5(f) and the chopped fiber bundle CFB5g of FIG. 5(g), plural blades having different shapes are used.

The chopped fiber bundle can also be produced by adding a shear force in thickness direction of chopped fiber bundle obtained by conventional production method of chopped fiber bundle in which cut ends of reinforcing fibers are lined in perpendicular direction to the longitudinal direction of chopped fiber bundle, to form transition sections in which the number of reinforcing fibers changes. Also, chopped fiber bundle can also be produced by spinning a continuous reinforcing fiber bundle by means of a draft-cut spinning. The chopped fiber bundle obtained by the draft-cut has a configuration in which, at both tip portions, reinforcing fibers of different length are arranged in longitudinal direction of the chopped fiber bundle and, by this portion, transition sections are formed.

The chopped fiber bundle contains a bundling agent for maintaining a state of bundle of the large number of reinforcing fibers which forms the bundle. The bundling agent can maintain the large number of reinforcing fibers in a bundle state and, in addition, it is no problem if the material has no problem in compatibility with a resin used when a molded article (fiber reinforced plastic) comprising the chopped fiber bundle is produced.

The chopped fiber bundle is produced by cutting a continuous reinforcing fiber bundle. To this continuous reinforcing fiber bundle, usually, to improve handling property of the fiber bundle, in a step of producing the continuous reinforcing fiber bundle, a sizing agent is imparted. Accordingly, this sizing agent can be used as it is as the bundling agent of the chopped fiber bundle and, in such a case, there is an advantage that it becomes unnecessary to prepare other bundling agent, separately.

On the other hand, the chopped fiber bundle is used for producing a molding material comprising its aggregate. Furthermore, molding material produced is used for producing a molded article (fiber reinforced plastic). In the production of the molding material or molded article, a matrix resin is used together with the chopped fiber bundle. Accordingly, this matrix resin can be used as it is as the bundling agent of the chopped fiber bundle and, in this case, there is an advantage that it becomes unnecessary to prepare other bundling agent, separately. In the case where the matrix resin is used as the bundling agent, the continuous reinforcing fiber bundle or the chopped fiber bundle to be combined with the matrix resin may contain a sizing agent or other bundling agent beforehand. However, in such a case, it is necessary to consider compatibility between the sizing agent or other bundling agent imparted beforehand and the matrix resin to be imparted later.

In the case where a sizing agent is used as a bundling agent, it is preferable that the amount of sizing agent to reinforcing fiber is 0.1 to 10 mass % based on total mass of the chopped fiber bundle. In the case where a sizing agent of the same amount as this amount has been imparted to the continuous reinforcing fiber bundle for producing a chopped fiber bundle, when the continuous reinforcing fiber bundle is cut, shape of chopped fiber bundle to be obtained by the cutting becomes a predetermined one, without the reinforcing fibers become separated into pieces. In the case where a chopped fiber bundle is produced from a continuous reinforcing fiber bundle, by the fact that a sizing agent of 0.1 to 10 mass % is imparted to the continuous reinforcing fiber to be used, processability is greatly improved in production step of the chopped fiber bundle. Also, handling property of the chopped fiber bundle when a molding material is produced by using the chopped fiber bundle is also improved.

For example, it is possible to obtain a chopped fiber bundle by imparting 0.1 to 10 mass % of a sizing agent dissolved or dispersed in a solvent to a drawn out continuous reinforcing fiber bundle, and after cutting the continuous reinforcing fiber bundle, by heating to dry the solvent, or after heating to dry the solvent, by cutting the continuous reinforcing fiber bundle.

As the sizing agent, for example, epoxy resin, phenol resin, unsaturated polyester resin, vinyl ester resin, polyamide resin, urethane resin, or mixed resins in which they are mixed are mentioned. These resins are imparted to the continuous reinforcing fiber bundle by diluting with water, solvent or the like.

In the case where a matrix resin is used as bundling agent, the matrix resin is, for example, imparted to unidirectionally drawn out continuous reinforcing fiber bundle. After that, continuous reinforcing fiber bundle imparted with the matrix resin is cut and a chopped fiber bundle in which the matrix resin is deposited to a large number of reinforcing fibers is obtained. When the matrix resin is imparted, the matrix resin may also be impregnated completely to a large number of reinforcing fibers constituting the continuous reinforcing fiber bundle. Also, as far as the large number of reinforcing fibers after cutting does not become separated into pieces, the matrix resin may be imparted to the continuous reinforcing fiber bundle in a state in which the matrix resin is unevenly distributed on surface of the continuous reinforcing fiber bundle.

In the case where matrix resin is used as bundling agent, it is preferable that the amount of the matrix resin to reinforcing fibers is 20 to 75 mass % based on the mass of the whole chopped fiber bundle. In the case where the matrix resin is imparted to the continuous reinforcing fiber bundle beforehand, when a chopped fiber bundle is produced by cutting the continuous reinforcing fiber bundle, it is possible to stably produce a chopped fiber bundle of predetermined shape without becoming the large number of reinforcing fibers separated into pieces. Also, handling property of the chopped fiber bundle is also improved at producing a molding material by integrating the obtained large number of chopped fiber bundles.

A preferable production method of the chopped fiber bundle comprises preparing a continuous reinforcing fiber bundle sheet in which plural continuous reinforcing fiber bundle are adjacently parallel, to impart a matrix resin of an amount of 20 to 75 mass % to the prepared continuous reinforcing fiber bundle sheet and to cut the continuous reinforcing fiber bundle sheet imparted with the matrix resin in straight line in arranging direction of the reinforcing fiber and in direction of an angle of 2 to 30° with respect to the arranging direction of reinforcing fiber. The above-mentioned continuous reinforcing fiber bundle sheet in which plural continuous reinforcing fiber bundles are adjacently parallel is, usually, prepared on a base material having releasability to the resin (e.g., release paper) or a base plate.

As the matrix resin, for example, thermosetting resins such as epoxy resin, unsaturated polyester resin, vinyl ester resin, phenol resin, epoxy acrylate resin, urethane acrylate resin, phenoxy resin, alkyd resin, urethane resin, maleimide resin or cyanate resin, or thermoplastic resins such as polyamide, polyacetal, polyacrylate, polysulfone, ABS, polyester, acryl, polybutylene terephthalate (PBT), polyethylene terephthalate (PET), polyethylene, polypropylene, polyphenylene sulfide (PPS), polyether ether ketone (PEEK), liquid crystal polymer, polyvinyl chloride, fluorine-based resin such as polytetrafluoroethylene, or silicone are mentioned.

In the case where a thermosetting resin among these is used, the obtained chopped fiber bundle has tackiness at room temperature. Accordingly, when a molding material is produced by integrating a large number of chopped fiber bundles, by utilizing this tackiness, it is possible to carry out the integration of the large number of chopped fiber bundles, and it is possible to produce a molding material at room temperature.

Among the thermosetting resins, epoxy resin, unsaturated polyester resin, vinyl ester resin, phenol resin, acryl resin, or a mixed resin thereof are preferably used. As a resin viscosity at room temperature (25° C.) of these resins, to be $1 \times 10^6$ Pa·s or less is preferable and, at this viscosity, it is possible to obtain a chopped fiber bundle having a preferable tackiness and drapability.

Figure 9:
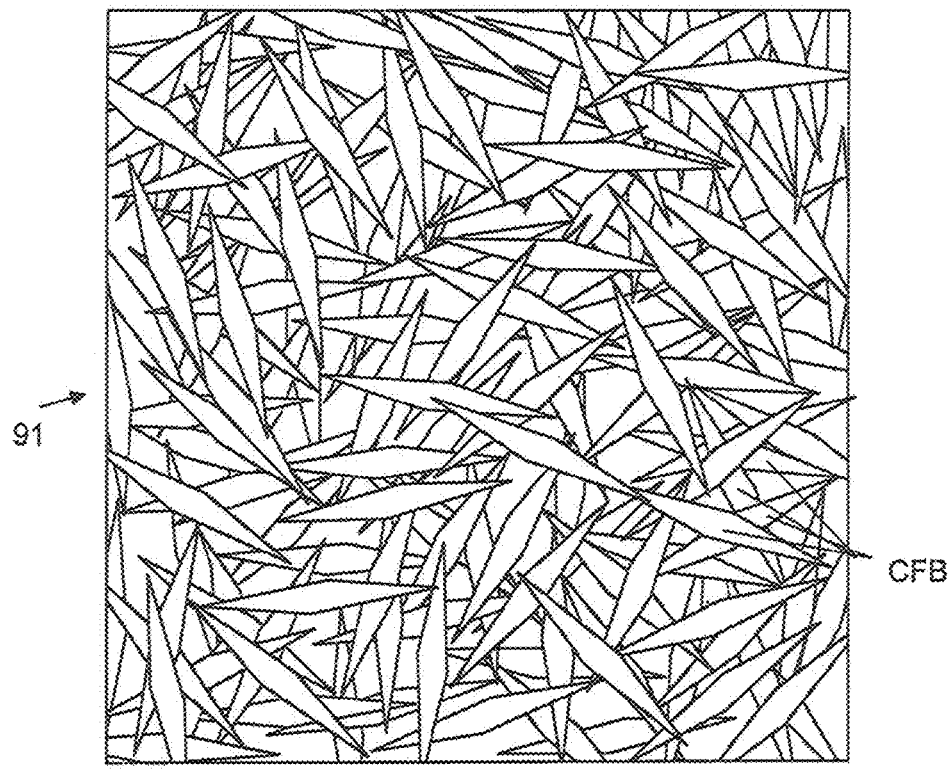
FIG. 9 is a plan view of an example of molding material.

The fiber reinforced plastic in which the chopped fiber bundle is used is produced by using molding material comprising an aggregate of a large number of chopped fiber bundles. FIG. 9 is a plan view of one example of molding material. In FIG. 9, a molding material 91 comprises an aggregate of a large number of chopped fiber bundle CFB (e.g., the chopped fiber bundle CFB3 shown in FIG. 3). Although the molding material comprises an aggregate of a large number of chopped fiber bundles, this may be combined with other base material, for example, a base material comprising a large number of continuous fibers. In any configuration, it is preferable that the molding material has, since it is used for producing a fiber reinforced plastic, good handling property or property suitable for compression moldings such as press molding or drape molding.

The molding material is produced by forming an aggregate of a large number of chopped fiber bundles, for example, after scattering a large number of chopped fiber bundles on a molding base in a sheet form, by integrating the large number of chopped fiber bundles by entangling adjacent reinforcing fibers of the chopped fiber bundles with each other by means such as needle punch or vibration. In the case where a matrix resin sheet is used as the molding base, after scattering a large number of chopped fiber bundles on the matrix resin sheet, another matrix resin sheet is superposed thereon, to thereby insert the large number of chopped fiber bundles into the upper and lower matrix resin sheets, it is possible to produce a molding material in which the large number of chopped fiber bundles and the matrix resin are integrated. Such a molding material is, usually, referred to as an SMC sheet or stampable sheet.

The molding material may be produced by scattering a large number of chopped fiber bundles impregnated with a matrix resin beforehand on a molding base in a form of sheet and, by utilizing tackiness of the matrix resin, integrating the large number of chopped fiber bundles. Also, the molding material may be constituted with an aggregate of a large number of chopped fiber bundles to which no matrix resin is impregnated. Such a molded article is preferably used in the case where a fiber reinforced plastic is produced by RTM (resin transfer molding) in which a matrix resin is injected when the fiber reinforced plastic is produced.

In the case where a sizing agent is used as bundling agent in the chopped fiber bundle, a sufficient tackiness between the chopped fiber bundles with each other at producing a molding material cannot be obtained in some cases. Also, in the case where a matrix resin is used as bundling agent in the chopped fiber bundle, handling property of the chopped fiber bundle at producing a molding material becomes worse in some cases. In these cases, as bundling agent, a bundling agent different from the sizing agent or matrix resin is used. In this way, it becomes possible to improve processability in production step of molding material.

As such a bundling agent, as its configuration, for example, bundling agents in liquid state, in a form of cloth or in a form of particle are mentioned. In view of handling property of bundling agent, particulate one is preferable. As component of such a bundling agent, for example, epoxy resin, vinyl ester resin, unsaturated polyester resin, polyamide as a low melting point polymer, polyester, polyurethane or a mixed resin thereof are mentioned. These bundling agents may be used as it is, or may be used by dispersing in a solvent such as water.

The main purpose of bundling agent in the chopped fiber bundle is maintaining or binding a large number of reinforcing fibers in a state of bundle, but it may also be made useful, by depositing the bundling agent to the reinforcing fibers more than sufficient amount for binding the reinforcing fibers, for bonding a large number of chopped fiber bundles with each other by the bundling agent. For example, by increasing an amount of sizing agent to be deposited to the reinforcing fibers, the large number of chopped fiber bundles may be integrated with each other. In the case where the matrix resin is a thermosetting resin, since it has tackiness at room temperature, a large number of chopped fiber bundles may be integrated by impregnating or semi-impregnating the reinforcing fibers with the matrix resin. In the case where the matrix resin is a thermoplastic resin, a large number of chopped fiber bundles may be integrated by pressing in a heated state to melting point or more. In these cases, since the molding material to be obtained comprises, other than reinforcing fibers, only the sizing agent and/or matrix resin, it is possible to decrease factors for lowering physical characteristics of the molding material.

In the case where the molding material contains a matrix resin, it is preferable that an amount of the matrix resin in the molding material is 20 to 75 mass %. In the case where the amount of the matrix resin in the molding material is less than 20 mass %, since the amount of the resin is small, flowability, which is one of important characteristics of the molding material, may be impaired. In the case where the amount of the matrix resin in the molding material is more than 75 mass %, since an amount of the reinforcing fibers becomes smaller than the amount of the resin, it becomes difficult to improve mechanical characteristics of the fiber reinforced plastic to be obtained. It is more preferable that the amount of the matrix resin in the molding material is 35 to 55 mass %.

As the matrix resin used for the molding material, a thermosetting resin is preferable in some cases. Since the thermosetting resin has a cross-linked structure, in general, it is high in modulus and excellent in shape stability. In a fiber reinforced plastic produced from that, a high modulus and an excellent dimensional stability are exhibited. In thermosetting resins, resin viscosity can be controlled in a low viscosity. For that reason, a thermosetting resin of which viscosity is appropriately controlled can easily be impregnated into a chopped fiber bundle. Also, by appropriately controlling viscosity of the thermosetting resin, as required, in any step of production of fiber reinforced plastic, it is possible to impart the resin. Also, a molding material in which resin is in an uncured state to room temperature has flexibility. For that reason, such a molding material is easy to be cut or to conform to a mold shape and excellent in handling property. Other than that, since it is possible to design to have tackiness at room temperature, such a molding material is integrated only by being pressed with each other or to other substrate and, therefore, operation for forming a laminate with each other or with other substrate becomes easy.

As the matrix resin used for the molding material, a thermoplastic resin is preferable in some cases. In general, since thermoplastic resins has high toughness, by using a thermoplastic resin as matrix resin, it is possible to prevent linkage of cracks generated, which is a weak point of short fiber reinforced plastic, with each other, and strength of the short fiber reinforced plastic is improved. In particular, in applications in which impact characteristics are important, it is better to use a thermoplastic resin as matrix resin. Molding of thermoplastic resin usually is not accompanied by a chemical reaction, and therefore the use of thermosetting resin can serve to shorten the molding time.

In the molding material, that is, in the aggregate of the chopped fiber bundles, it is preferable that the arranging directions of reinforcing fibers of each chopped fiber bundle are the same. By laminating a plurality of molding materials of which arranging directions of reinforcing fibers are the same, it becomes easy to design a laminate having desired physical characteristics. It becomes easy to decrease dispersion of mechanical characteristics of a laminate to be obtained. Such a molding material is produced by scattering a large number of chopped fiber bundles on a substrate in a form of sheet such that the arranging directions of reinforcing fibers of each chopped fiber bundle are the same. As means for scattering each chopped fiber bundle such that arranging direction of the respective reinforcing fibers becomes the same, for example, a slit nozzle capable of supplying each chopped fiber bundle on a substrate in a state in which arranging direction of reinforcing fiber is directed to a fixed direction is mentioned.

It is no problem if arranging direction of the reinforcing fiber of each chopped fiber in the molded article, that is, in the aggregate of the chopped fiber bundles is substantially the same, respectively. The state where the arranging directions of the reinforcing fibers of each chopped fiber is substantially the same refers to a state in which, when average of the arranging directions of the reinforcing fiber contained in the chopped fiber bundle is taken as the representative arranging direction of the reinforcing fibers in the chopped fiber bundle, those chopped fiber bundles in the chopped fiber bundle aggregate with their representative arranging directions staying within ±10% account for 90% or more of the total chopped fiber bundles of the aggregate of chopped fiber bundles.

In the case where the molding material comprises a laminate containing a laminate of plural sheet assemblies of the chopped fiber bundles, it is preferable that arranging directions of reinforcing fibers of each chopped fiber bundle in each sheet aggregate of the chopped fiber bundles are the same and, in addition, in the laminate, arranging direction of the reinforcing fiber in the sheet aggregate of the chopped fiber bundles which forms one layer and arranging direction of the reinforcing fiber in sheet aggregate of the chopped fiber bundles which forms another layer are different.

In general, fiber reinforced plastic is broken when cracks are linked in direction perpendicular to direction of force (thickness direction). By forming a molding material with a laminate to make it hard that the cracks penetrate into thickness direction, it is possible to obtain a high strength fiber reinforced plastic. That is, in a laminate constituting molding material, when two layers are made into different arranging direction of the reinforcing fiber, since directions easy to generate cracks are different, it becomes hard that cracks penetrate through layers. It is preferable that the two layers having different arranging direction of the reinforcing fiber are adjacent two layers.

Such a molding material is produced by, for example, scattering a large number of chopped fiber bundles in a sheet form over a substrate in such a manner that the reinforcing fibers in each chopped fiber bundle are arranged in the same direction, to form a layer comprising an aggregate of chopped fiber bundles, and scattering a large number of chopped fiber bundles in a sheet form over the layer formed above in such a manner that the arranging direction of these reinforcing fibers is different from the arranging direction of the reinforcing fibers of the chopped fiber bundle in the layer formed first while the reinforcing fibers in one chopped fiber bundle are in the same arranging direction. As a laminate constitution, a quasi-isotropic lamination such as $[+45/0/-45/90]_s$ or $[0/\pm 60]_s$ is preferable since it is possible to make physical characteristics of laminate (molding material) uniform as a whole, and it is possible to prevent a generation of warp of laminate (molding material) to be obtained.

On the other hand, molding material 91 of FIG. 9 comprises an aggregate in which the large number of chopped fiber bundles CFB locate in a state in which arranging directions of the respective reinforcing fibers are random. The large number of chopped fiber bundles CFB are superposed partially, but a clear layer structure is not formed. This molding material 91 can be, compared to a case in which a molding material having a layer structure in which arranging direction of the reinforcing fiber of the chopped fiber bundle is controlled, produced in a low cost, and it can be said to be a molding material which is isotropic and easy to design.

As another example of the molding material, there is a pellet for injection molding obtainable by kneading a large number of chopped fiber bundles and a thermoplastic resin, and molding by continuously extruding in a form of rod and cutting the molded continuous rod in its longitudinal direction at a predetermined interval. Conventional pellet for injection molding is produced by cutting, by a rotary cutter or the like, a continuous reinforcing fiber bundle in perpendicular direction to the arranging direction of reinforcing fiber to make a chopped fiber bundle, kneading the obtained chopped fiber bundle together with a thermoplastic resin in an extruder, molding by continuously extruding in a form of rod, and by cutting the molded continuous rod in its longitudinal direction at a predetermined interval. In the chopped fiber bundle, since the tip portion of each reinforcing fiber is arranged at a shifted position with each other in arranging direction of the reinforcing fiber, in the case where it is kneaded with a resin of high viscosity such as thermoplastic resin, the reinforcing fibers are easy to be separated and it is possible to obtain a molding material excellent in dispersibility and of little aggregation.

The aggregate of the chopped fiber bundles comprising a large number of chopped fiber bundles may be three-dimensionally shaped such that it has at least one bending portion in cross-sectional shape. In the case where a fiber reinforced plastic having also a three dimensional shape is molded by using the molding material having a three dimensional shape, it is not necessary to make the chopped fiber bundles flow greatly during molding, preventing waving and maldistribution of the arranged reinforcing fibers from being caused by the flow, and as result fiber reinforced plastics with high quality stability can be obtained.

It is possible to produce the molding material having a three dimensional shape, for example, by the following way. A production method of molding material in which a large number of chopped fiber bundles are scattered on a molding base in a form of sheet to thereby integrate, and shaping the integrated sheet into a three-dimensional shape. A production method of molding material in which a large number of chopped fiber bundles are scattered on a molding base having a three dimensional shape while making the arranging directions of reinforcing fibers of each chopped fiber bundle into the same direction by passing through a slit nozzle, to form a layer comprising an aggregate of the chopped fiber bundles of which arranging directions of reinforcing fibers are the same, and on the formed layer, a large number of chopped fiber bundles are scattered in a form of sheet such that they are made into a different arranging direction of the reinforcing fiber from the arranging direction of reinforcing fiber of the chopped fiber bundle in the formed layer and, in addition, arranging directions of reinforcing fibers of each chopped fiber bundle are made into the same direction.

Figure 10:
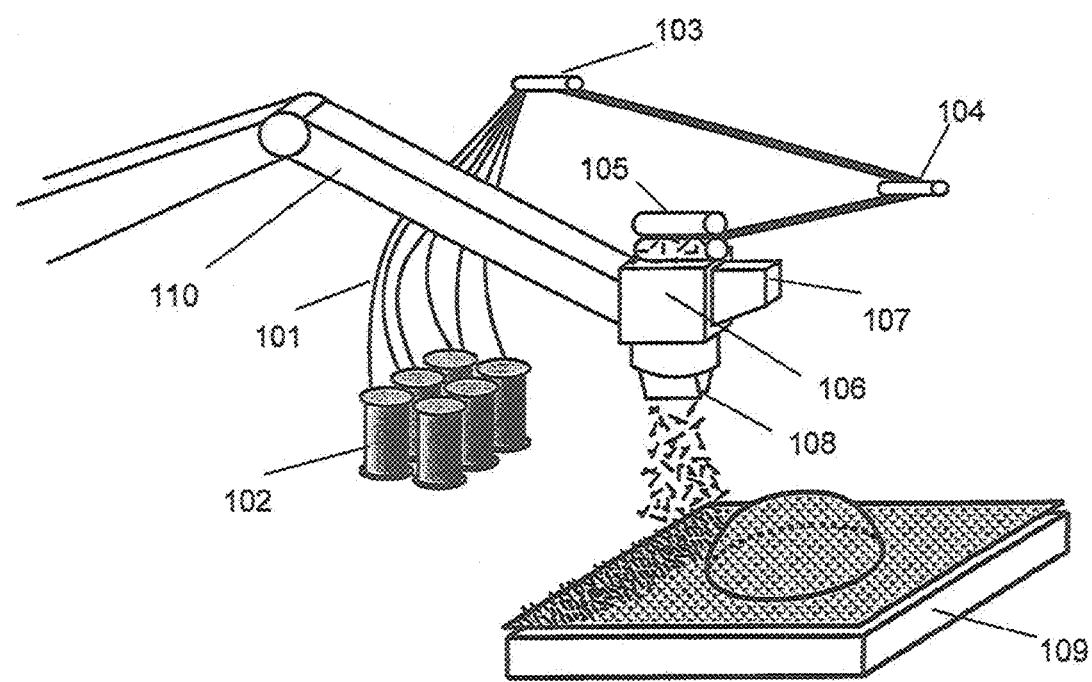
FIG. 10 is a schematic perspective view for explaining an example of production method of molding material.

FIG. 10 is a schematic perspective view to explain one example of the production method of molding material having a three dimensional shape. In FIG. 10, a production apparatus of molding material having three dimensional shape comprises a plurality of bobbins 102 (in FIG. 10, six bobbins are shown) on each of which a continuous reinforcing fiber bundle 101 is wound, guide rollers 103 and 104 for the continuous reinforcing fiber, a roller cutter 105 which takes out the continuous reinforcing fibers from the bobbins 102 and cuts the continuous reinforcing fibers at fixed interval in a direction inclined with respect to longitudinal direction of the continuous reinforcing fiber, a bundling agent feeding device 106 which imparts a bundling agent to chopped fiber bundles obtained by cutting the continuous reinforcing fibers, a bundling agent supply port 107 provided to side portion of the bundling agent feeding device 106, a slit nozzle 108 which controls arranging direction of the reinforcing fibers of the chopped fiber bundles imparted the bundling agent into a fixed direction, a molding base 109 comprising a shaping mold having three dimensional shape, and a robot arm 110.

The roller cutter 105 is fixed to upper portion of the bundling agent feeding device 106. The bundling agent feeding device 106 has, in its upper portion, a chopped fiber bundle inlet for receiving chopped fiber bundles obtained by the cutting, and in its lower portion, a chopped fiber bundle discharge port which discharges the chopped fiber bundle to which the bundling agent has been imparted. The slit nozzle 108 has, in its upper portion, a chopped fiber bundle inlet which receives the chopped fiber bundles discharged from the chopped fiber bundle discharge port, and in its lower portion, a chopped fiber bundle discharge port which discharges the chopped fiber bundles of which arranging direction of the reinforcing fiber has been controlled in the fixed direction. The slit nozzle 108 is fixed to the lower portion of the bundling agent feeding device 106. The tip of the robot arm 110 is connected to a side portion of the bundling agent feeding device 106. The tip of the robot arm 110 is made freely movable with respect to the molding base 109, by a robot arm operating apparatus (not shown in the figure).

In FIG. 10, the continuous reinforcing fiber bundle 101 taken out from the bobbin 102 by the roller of the roller cutter 105 is introduced to the roller cutter 105 through the guide rollers 103 and 104 and, at that position, it is cut such that chopped fiber bundles are formed. The chopped fiber bundles obtained by the cutting are introduced to the bundling agent feeding device 106. Inside the bundling agent feeding device 106, a powdery bundling agent supplied from the bundling agent supply port 107 is imparted to the chopped fiber bundles. The chopped fiber bundle imparted with the bundling agent is introduced to the slit nozzle 108. As the chopped fiber bundles move inside the slit nozzle 108, the chopped fiber bundles are arranged such that the arranging direction of reinforcing fiber is made into the fixed direction. The arranged chopped fiber bundles are discharged from the slit nozzle 108, and drop with the arrangement of the chopped fiber bundle substantially maintained, to arrive at a surface of the molding base 109.

Arriving position of the chopped fiber bundle at the surface of the molding base 109 is, by an operation of the robot arm 110, changed one after another, to form a layer of the chopped fiber bundles, deposited with the powdery bundling agent, on the molding base 109. A layer of the chopped fiber bundles formed on the molding base 109 is heated to melt the powdery bundling agent contained therein, and by the melted bundling agent, an integration of the chopped fiber bundles with each other is carried out, to produce the molding material having a three dimensional shape.

A fiber reinforced plastic comprises an aggregate of chopped fiber bundles and a matrix resin. Accordingly, the chopped fiber bundles in the fiber reinforced plastic has its fiber length of reinforcing fiber of 5 to 100 mm, and has, from both ends of the chopped fiber bundle to the center portion in longitudinal direction of the chopped fiber bundle, along arranging direction of the reinforcing fiber, transition sections in which number of reinforcing fibers in cross-section of the chopped fiber bundle increases, and across whole area of the chopped fiber bundle, the change of total cross-sectional area of reinforcing fibers in cross-section of the chopped fiber bundle is 0.05 mm$^2$ or less per 1 mm.

Since the chopped fiber bundle in fiber reinforced plastic has a configuration in which number of reinforcing fibers decreases from the center portion to the tip portions, in the fiber reinforced plastic, a force born by a chopped fiber bundle can gradually be shared to chopped fiber bundles in vicinity, and it is possible to effectively decrease stress concentration. In particular, across the whole area of the chopped fiber bundle, by being the change of total cross-sectional area of reinforcing fibers 0.05 mm$^2$ or less per 1 mm, stress transmission efficiency is greatly improved. It is preferable that this change is 0.04 mm$^2$ or less. To minimize the effect of stress concentration, it is better that this change is 0.025 mm$^2$ or less. In the case of carbon fiber of which diameter of the reinforcing fiber (monofilament) is about 5 to 10 μm, across whole area of the chopped fiber bundle, it is better that total change of number of reinforcing fibers is 1,400 fibers or less per 1 mm. It is more preferable that this total change of number is 1,000 fibers or less. To minimize the effect of stress concentration, it is better that this total change of number is 600 fibers or less.

Figure 12:
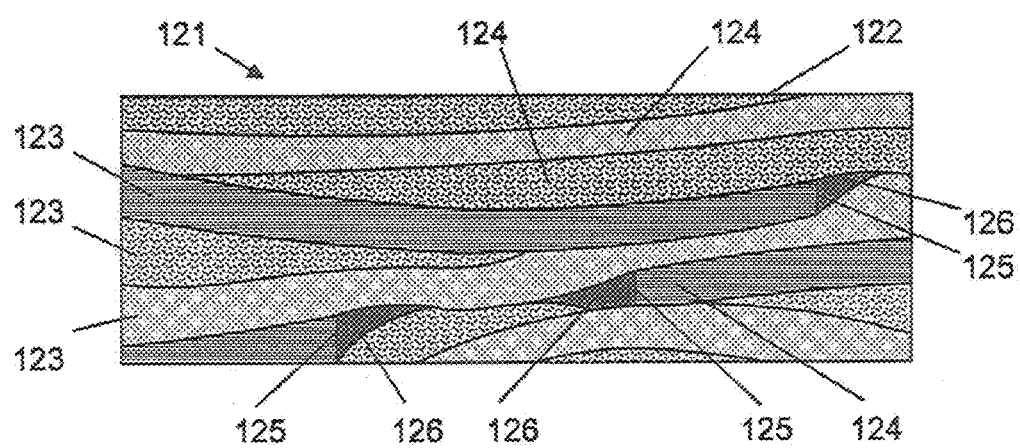
FIG. 12 is a cross sectional view of an example of conventional fiber reinforced plastic.

FIG. 12 is a cross sectional view of one example of conventional fiber reinforced plastic comprising an aggregate of conventional chopped fiber bundles and a matrix resin. In FIG. 12, the cross-section 122 of the conventional fiber reinforced plastic 121 cut in thickness direction (in FIG. 12, up and down direction (vertical direction)) is shown. When the cross-section 122 is observed, it is found that at the tip portion 125 of the conventional chopped fiber bundle 124 where a large number of reinforcing fibers 123 are arranged approximately parallel to left and right direction (horizontal direction) of the cross-section 122, tip portions of the large number of reinforcing fibers 123 are present in substantially the same position in up and down direction (vertical direction) of the cross-section 122. That is, tip portions of the large number of reinforcing fibers 123 are, at the tip portion 125 of the chopped fiber bundle 124, concentrated in one position without shifted with each other in its longitudinal direction, and it is found that the tip portion 125 of the chopped fiber bundle 124 is precipitous in up and down direction (vertical direction) of the cross-section 122.

In cross-section 122 of the conventional fiber reinforced plastic 121 shown in FIG. 12, when a force is loaded in left and right direction (horizontal direction) of the cross-section 122, stress concentration is generated and at a low force, the fiber reinforced plastic 121 is broken in some cases. Also, since the chopped fiber bundle 124 comprising the tip portion 125 of a large number of reinforcing fibers 123 arranged in a direction approximately parallel to left and right direction (horizontal direction) of cross-section 122 has the above-mentioned geometric shape, when the fiber reinforced plastic 121 is molded, a wave of the conventional chopped fiber bundle 124 is easy to be generated in its thickness direction (up and down direction (vertical direction) of the cross-section 122). The generated wave of the chopped fiber bundle 124 causes a decrease of modulus or strength of the molded fiber reinforced plastic 121. Furthermore, at outside of the tip portion 125 of the chopped fiber bundle 124, in contact with the tip portion 125, a resin puddle 126 of matrix resin is easy to be generated. The generated resin puddle 126 not only becomes a generation source of cracks by thermal stress, but also becomes a generation source of voids.

Figure 11:
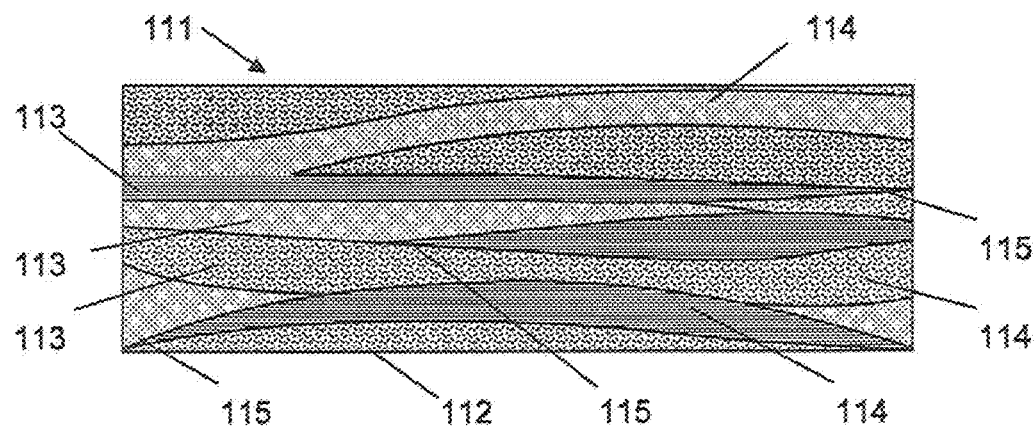
FIG. 11 is a cross sectional view of an example of fiber reinforced plastic.

FIG. 11 is a cross sectional view of one example of our fiber reinforced plastic comprising an aggregate of the chopped fiber bundle and a matrix resin. In FIG. 11, the cross-section 112 obtained by cutting the fiber reinforced plastic 111 in thickness direction (in FIG. 11, up and down direction (vertical direction)) is shown. When the cross-section 112 is observed, it is found that number of the reinforcing fibers 113 of the chopped fiber bundle 114, in which a large number of reinforcing fibers 113 is arranged approximately parallel to left and right direction (horizontal direction) of the cross-section 112, decreases continuously from center portion of the chopped fiber bundle 114 toward the tip portion 115.

The state in which the number of the reinforcing fibers 113 of the chopped fiber bundle 114 decreases from center portion toward the tip portion 115 of the chopped fiber bundle 114 means that, in the cross-section 112 of the fiber reinforced plastic 111 shown in FIG. 11, when a force is loaded to left and right direction (horizontal direction) of the cross-section 112, transmission of the force between adjacent chopped fiber bundles 114 is not effected immediately, i.e., it is gradually effected and a stress concentration is hard to be generated. That is, transmission efficiency of force in the fiber reinforced plastic 111 is improved compared to that of the conventional fiber reinforced plastic 121.

Furthermore, since the tip portion 115 of the chopped fiber bundle 114 is thin, almost no wave of the chopped fiber bundle 114 in thickness direction of the fiber reinforced plastic 111 is generated. By this state, improvement of modulus or strength of the fiber reinforced plastic 111 is brought about. Furthermore, the rein puddle observed in the conventional fiber reinforced plastic 121 is almost hardly generated.

Provided that the fiber length of each reinforcing fiber 123 of each chopped fiber bundle 124 contained in the conventional fiber reinforced plastic 121 and the fiber length of each reinforcing fiber 113 of each chopped fiber bundle 114 contained in the fiber reinforced plastic 111 are the same, since, compared to the across length Ld of the chopped fiber bundle (refer to FIG. 6) of each chopped fiber bundle 124 contained in the conventional fiber reinforced plastic 121, the across length Ld of the chopped fiber bundle (refer to FIGS. 1 to 3) of each chopped fiber bundle 114 contained in the fiber reinforced plastic 111 is long, average thickness of each chopped fiber bundle contained in the fiber reinforced plastic becomes small. As a result, compared to the conventional fiber reinforced plastic 121, the fiber reinforced plastic 111 has better mechanical characteristics.

In the cross-section 112 of the fiber reinforced plastic 111, it is preferable that in its thickness direction (in FIG. 11, up and down direction (vertical direction)), at least 20 of the chopped fiber bundle 114 are accumulated.

The number of accumulation of the chopped fiber bundle is the average value of 10 measured values obtained by measuring number of chopped fiber bundle present in thickness direction by a cross-sectional observation, in the respective of 10 points randomly selected on surface of fiber reinforced plastic. It is general that, in fiber reinforced plastic, thickness is thin compared to its entire size, and as the thickness of each chopped fiber bundle contained in fiber reinforced plastic becomes thinner with respect to thickness of the fiber reinforced plastic, the strength of fiber reinforced plastic increases higher. In particular, in the case where 20 or more chopped fiber bundles are accumulated in thickness direction of fiber reinforced plastic, improvement of strength of the fiber reinforced plastic is significant. It is preferable that the number of accumulation of the chopped fiber bundle is 30 or more and, to realize a stable strength of which strength dispersion is small, it is more preferable that the number of accumulation of chopped fiber bundle is 40 or more.

In a cross-section of fiber reinforced plastic, it is preferable that an average thickness of each chopped fiber bundle present therein is 100 µm or less.

The average thickness of the chopped fiber bundle is the average value of 10 points obtained by, in the respective of 10 points randomly selected on surface of fiber reinforced plastic, measuring number of chopped fiber bundle present in thickness direction and thickness of each chopped fiber bundle by a cross-sectional observation, and dividing the total of the obtained each thicknesses by the number of chopped fiber bundle.

It is better that the thickness of chopped fiber bundle in the fiber reinforced plastic is thin, and it is preferable to be 100 µm or less. To realize a stable strength of which strength dispersion is small, it is more preferable that the thickness of chopped fiber bundle is 50 µm or less.

A chopped fiber bundle of which thickness is 50 µm or less is difficult to produce in some cases by simply cutting a continuous reinforcing fiber bundle. In the molding material, as means for making thickness of chopped fiber bundle into 50 µm or less, a means in which, when a molding material is press-molded from a large number of chopped fiber bundles, the large number of chopped fiber bundles is placed relatively thick on a mold in a range smaller than a mold area such that a charge ratio of chopped fiber bundle is low, and each chopped fiber bundle is opened while being pressed to mold a molding material, is mentioned. Whereas, the charge ratio is referred to, when the mold is viewed from the above, an area occupied by the molding material (starting material of molding material) before starting the press with respect to the mold area. The same means can also be used when a fiber reinforced plastic is molded from a molding material or a large number of chopped fiber bundles.

As another means for making thickness of chopped fiber bundle 50 µm or less, a means in which, when a chopped fiber bundle is produced from a continuous reinforcing fiber bundle, the continuous reinforcing fiber bundle is cut after opening, is mentioned. The opening of continuous reinforcing fiber bundle can be done, for example, by contacting a running continuous reinforcing fiber bundle with a roller or vibrating or air blowing.

In the case where a fiber reinforced plastic comprises a laminate of plural layers of which each layer comprises a reinforcing fiber and a matrix resin, it is preferable that at least 2 layers of the plural layers are formed with an aggregate of a large number of chopped fiber bundles, and arranging directions of reinforcing fibers contained in each chopped fiber bundle in the respective 2 layers are the same with each other and, in addition, arranging directions of the reinforcing fiber of the 2 layers are different with each other.

Such a fiber reinforced plastic is, since it becomes easy to design such that desired mechanical characteristics are obtained by controlling arranging direction of the reinforcing fiber contained in chopped fiber bundle of each layer which comprises the aggregate of the chopped fiber bundles, compared to a fiber reinforced plastic of which arranging direction of the reinforcing fiber is random, dispersion of mechanical characteristics is small. Also, in such a fiber reinforced plastic, since between the 2 layers comprising the aggregate of the chopped fiber bundles, directions in which crack is easy to generate are different, spreading of cracks to adjacent layer is prevented, and it becomes possible to realize a high strength in fiber reinforced plastic. It is more preferable that both of adjacent layers comprise the aggregate of the chopped fiber bundles.

A fiber reinforced plastic is produced by, for example, arranging the molding material in a cavity of a mold in a state smaller than projected area of the cavity and, in addition, thicker than the cavity thickness, and by extending the molding material by clamping the mold to pressurize the molding material and to finally fill in the cavity with the molding material, and after completing the molding, by taking out the molded article from the mold. Further, a fiber reinforced plastic is produced by arranging the molding material in a sealed cavity of a mold, and injecting a matrix resin to impregnate in the molding material with the matrix resin.

The molding material or the fiber reinforced plastic is preferably used for production of members for sports goods such as parts of bicycle, shaft or head of golf club in which strength, rigidity and lightness are required, interior materials for aircraft, automobile parts such as door or sheet frame, and machine parts such as robot arm. Among them, it is more preferably used for production of automobile parts such as sheet panel or sheet frame in which, in addition to strength and lightness, mold following capability to complicated shape at molding is required.

Next, some of examples are explained. This disclosure is not limited to these examples.

Measuring method of tensile strength of fiber reinforced plastic in the examples:

From a flat plate fiber reinforced plastic obtained in an example, a test piece for tensile strength of a length of 250±1 mm and a width of 25±0.2 mm was cut out. For the obtained test piece, in accordance with the test method prescribed in JIS K-7073 (1998), tensile strength was measured by setting distance between marks to 150 mm and at a cross-head speed of 2.0 mm/minute. As a tensile strength tester, Instron (trademark) 4208 universal tester was used. Number of the test pieces provided to the measurement was 5 pieces and average value of each measured value was taken as the tensile strength of the fiber reinforced plastic.

Example 1

As a continuous reinforcing fiber bundle, a continuous reinforcing fiber bundle comprising a large number of carbon fibers having substantially no twist and no sizing was used. Diameter of the reinforcing fiber (single fiber) was 7 μm, number of the reinforcing fibers was 12,000, tensile strength of the reinforcing fiber bundle was 5.0 GPa and tensile modulus of the reinforcing fiber bundle was 240 GPa. The continuous reinforcing fiber bundle was continuously immersed in a sizing agent mother liquid in which a reactive urethane resin emulsion (produced by Dai-ichi Kogyo Seiyaku Co., Ltd., Superflex-R5000) is diluted with purified water such that the resin component is made into 2.0 mass %, to impart the sizing agent to the continuous reinforcing fiber bundle. The continuous reinforcing fiber bundle to which the sizing agent was imparted was dried by hot rollers of 150° C. and a drying furnace of 200° C. under a dry tension of 600 g/dtex, to remove water. Amount of the sizing agent was 1.2 mass %.

A rotary cutter provided with blades at 5 mm interval along peripheral direction was prepared. The continuous reinforcing fiber bundle to which the sizing agent was imparted was continuously inserted to the rotary cutter at an angle of 12° with respect to the blades of rotary cutter, to produce a chopped fiber bundle. The obtained chopped fiber bundle had the shape of the chopped fiber bundle CFB3 shown in FIG. 3, that is, it had no constant section and had two transition sections 13a and 13b. The angle made by the side 15a and the side 16a, and the angle made by the side 15b and the side 16b at both tip portions of the chopped fiber bundle CFB3, were an angle of 12°, respectively. The fiber length Lf of each reinforcing fiber 11 was, although there was dispersion of about 3% in the same chopped fiber bundle, 25 mm. Number of increase of the reinforcing fiber 11 in each transition section 13a or 13b was, 500 fibers±100 fibers per 1 mm of the reinforcing fiber 11 in arranging direction. Change of total cross-sectional area of the large number of reinforcing fibers 11 in each transition section 13a or 13b was, 0.016 to 0.023 $mm^2$ per 1 mm in arranging direction of the reinforcing fiber 11.

In arranging direction of the reinforcing fiber 11, sections of 1 mm were randomly determined in 3 sections, numbers of reinforcing fibers at starting point and end point in each section are measured, differences therebetween are determined, and they are taken as change of number of the reinforcing fibers 11 in the sections, and average value of the changes in the three sections is taken as change of number of reinforcing fibers per 1 mm in arranging direction of reinforcing fiber in the transition sections 13a and 13b of the chopped fiber bundle CFB3. Total cross-sectional area of the large number of reinforcing fibers 11 was determined by multiplying the obtained change of number of reinforcing fibers by the cross-sectional area $3.85 \times 10^{-5}$ $mm^2$ of the reinforcing fiber (single fiber) 11.

As a matrix resin, vinyl ester resin (produced by Dow Chemical Co., Derakane 790) 100 wt parts, as a curing agent, tert-butyl peroxybenzoate (produced by Nippon Oil & Fats Co., Perbutyl Z) 1 wt part, as an internal release agent, zinc stearate (produced by Sakai Chemical Industry Co., SZ-2000) 2 wt parts and as a thickener, magnesium oxide (produced by Kyowa Chemical Industry Co., MgO#40) 4 wt parts were used and they were sufficiently mixed and stirred to obtain a resin paste. The obtained resin paste (matrix resin) was coated on the respective 2 release films made of polypropylene by a doctor blade, to obtain 2 resin sheets. On the surface of the matrix resin of one of the obtained resin sheets, from its upper side, a large number of the above-mentioned chopped fiber bundles CFB3 were uniformly dropped to scatter such that the weight per unit area was made into 725 $g/m^2$. On the surface on which the chopped fiber bundles were scattered of the obtained resin sheet on which the chopped fiber bundles were scattered, the other resin sheet prepared beforehand was laminated with the matrix resin surface inside, to obtain an SMC sheet. The volume content of the reinforcing fiber in the SMC sheet was made into 40%. By leaving to stand the obtained SMC sheet for 24 hours at 40° C., the matrix resin was thickened sufficiently, to obtain the molding material 91 made of SMC sheet as shown in FIG. 9.

From this molding material (SMC sheet) 91, 4 sheets of 250×250 mm size were cut out, and after superposed into 4 layers, it was arranged on approximately center portion on a flat plate mold having a cavity of 300×300 mm size. Charged ratio at this arrangement is 70%. After that, by a heat press molding machine, the matrix resin was cured under a pressure of 6 MPa and by a condition of 150° C.×5 minutes, to obtain a flat plate fiber reinforced plastic of 300×300 mm size.

In the cavity of the mold used, the molded fiber reinforced plastic had been filled and it was found that flowability of the molding material during the molding step was good. The produced fiber reinforced plastic contacted with flat surface of test bed in its entire surface when it was only placed on the flat surface of test bed, and it was found that there was no warp.

Thickness of the fiber reinforced plastic was 2.8 mm, and at 10 points randomly selected on a surface of the fiber reinforced plastic, number of chopped fiber bundles present in thickness direction was measured by cross-sectional observation, and when the data of the 10 points were averaged, it was found to be 32. By this fact, it was found that the average thickness of the chopped fiber bundle was found to be approximately 90 µm.

According to the result of tensile test of the fiber reinforced plastic, it showed that the tensile modulus was very high as 33 GPa, and the tensile strength was high as 330 MPa. When compared to Comparative Example 1 to be mentioned later, improvement of mechanical characteristics of 35% or more in modulus and 2 times or more in strength were obtained. Also, when the fiber reinforced plastic was cut out and the cut surface was observed, as shown in FIG. 11, chopped fiber bundle was getting thinner from the center portion toward the tip portion, in particular, chopped fiber bundle which runs parallel to the cut surface was also getting thinner from the center portion toward the tip portions, and the state in which the number of reinforcing fibers is decreasing can be seen, and it was found that a significant effect was obtained that not only tensile strength but also modulus were improved in the extent of improvement of load transmitting efficiency.

Example 2

At obtaining a chopped fiber bundle by cutting the same continuous reinforcing fiber bundle as that of Example 1, blades were provided at 12.5 mm interval in peripheral direction of a rotary cutter and a continuous reinforcing fiber bundle was inserted at an angle of 30° with respect to the blades. The obtained chopped fiber bundle was the chopped fiber bundle CFB2 of the configuration as shown in FIG. 2. The sides 16a and 16b of tip portion of the chopped fiber bundle CFB2 had a form of straight line at an angle of 30° with the arranging direction of the reinforcing fiber 11, and the fiber length Lf of the reinforcing fiber 11 was 25 mm, although there was an dispersion of about 2% in the same chopped fiber bundle. From the tip portion to the center portion of the chopped fiber bundle CFB2 there was the transition sections 13a and 13b in arranging direction of the reinforcing fiber 11 in which number of reinforcing fibers increases and the number of reinforcing fibers increased in the range of 1,300 fibers±100 fibers per 1 mm in arranging direction of the reinforcing fiber. Also, change of total cross-sectional area of the large number of reinforcing fibers 11 in the transition sections 13a and 13b was 0.047 to 0.054 mm² per 1 mm in arranging direction of the reinforcing fiber.

By using the chopped fiber bundle CFB2 obtained in this way, an SMC sheet (molding material) was prepared in the same way as Example 1 and a fiber reinforced plastic was molded in the same way as Example 1. The molded fiber reinforced plastic had been filled in the mold cavity used and it was found that the flowability of molding material in molding step was good. The produced fiber reinforced plastic contacted in its entire surface with flat surface of test bed by only being placed on the flat surface of test bed, and it was found that there was no warp.

The thickness of the fiber reinforced plastic was 2.8 mm, and number of chopped fiber bundles present in thickness direction (how many chopped fiber bundles of which arranging directions of reinforcing fiber were different crossed in thickness direction) was measured by a cross-sectional observation at 10 points randomly selected on a surface of the fiber reinforced plastic and when the data of the 10 points were averaged, it was found to be 22. By this fact, it was found that the average thickness of the chopped fiber bundle was about 130 µm.

Next, a tensile test was carried out in the same way as Example 1. The tensile modulus was high as 29 GPa and as to tensile strength also, a high value as 250 MPa was obtained. When compared to Comparative Example 1 to be mentioned later, increase of mechanical characteristics of 20% or more in modulus and about 70% in strength was obtained. Also, when the fiber reinforced plastic was cut out and the cut surface was observed, as shown in FIG. 11, the chopped fiber bundle was getting thinner from the center portion toward the tip portion, in particular, chopped fiber bundle which runs parallel to the cut surface was also getting thinner from the center portion toward the tip portions, and the state in which the number of reinforcing fibers is decreasing can be seen, and it was found that a significant effect was obtained that not only tensile strength but also modulus were improved in the extent of improvement of load transmitting efficiency.

Example 3

As a continuous reinforcing fiber bundle, a continuous reinforcing fiber bundle (RS570M-521ZS, fiber weight 570 tex, produced by Nitto Boseki Co., Ltd.) comprising a large number of glass fibers to which a sizing agent had been deposited was used. This continuous reinforcing fiber bundle was taken out in an untwisted state from a bobbin by peripheral unwinding, cut in the same way as Example 1, to obtain chopped fiber bundles. The obtained chopped fiber bundle was the chopped fiber bundle CFB2 in a shape as shown in FIG. 2. The sides 16a and 16b of tip portion of the chopped fiber bundle CFB2 were in a form of straight line of an angle of 12° with respect to arranging direction of the reinforcing fiber 11 and the fiber length Lf of the reinforcing fiber 11 was 25 mm, although there was an dispersion of about 2% in the same chopped fiber bundle. From the tip portions to the center portion of the chopped fiber bundle CFB2 there were the transition sections 13a and 13b in which number of reinforcing fibers increases in arranging direction of the reinforcing fiber 11 and number of reinforcing fibers was increased in the range of 230 fibers±40 fibers per 1 mm in arranging direction of the reinforcing fiber. Also, change of total cross-sectional area of the large number of reinforcing fibers 11 in the transition sections 13a and 13b was 0.015 to 0.021 mm² per 1 mm in arranging direction of the reinforcing fiber. The total cross-sectional area of the large number of reinforcing fibers 11 was determined by multiplying $7.85 \times 10^{-5}$ mm$^2$ which is the cross-sectional area of the reinforcing fiber (single fiber) 11 to the obtained change of number of reinforcing fibers.

Except changing the weight per unit area of the chopped fiber bundle to 1,000 g/m$^2$, an SMC sheet (molding material) was prepared in the same way as Example 1 and a fiber reinforced plastic was molded in the same way as Example 1. The molded fiber reinforced plastic had been filled in the mold cavity used, and it was found that the flowability of molding material in molding step was good. The produced fiber reinforced plastic contacted in its entire surface with flat surface of test bed by only being placed on the flat surface of test bed, and it was found that there was no warp.

The thickness of the fiber reinforced plastic was 2.8 mm, and number of chopped fiber bundles present in thickness direction was measured by a cross-sectional observation at 10 points randomly selected on surface of the fiber reinforced plastic and when the data of the 10 points were averaged, it was found to be 29. By this fact, it was found that the average thickness of the chopped fiber bundle was about 100 µm.

Next, a tensile test was carried out in the same way as Example 1. The tensile modulus was high as 18 GPa, and as to tensile strength, a high value was obtained as 300 MPa. When compared to Comparative Example 4 to be mentioned later, increase of mechanical characteristics of about 20% in modulus and about 70% in strength was obtained. Also, when the fiber reinforced plastic was cut out and the cut surface was observed, and as shown in FIG. 11, chopped fiber bundle was getting thinner from the center portion toward the tip portion, in particular, chopped fiber bundle which runs parallel to the cut surface was also getting thinner from the center portion toward the tip portions, and the state in which the number of reinforcing fibers is decreasing can be seen, and it was found that a significant effect was obtained that not only tensile strength but also modulus were improved in the extent of improvement of load transmitting efficiency.

Example 4

To an epoxy resin (produced by Japan Epoxy Resins Co., "Epikote (trademark)"828:30 wt parts, "Epikote (trademark)"1001:35 wt parts and "Epikote (trademark)"154:35 wt parts), a thermoplastic resin, polyvinyl formal (produced by Chisso Corp., "Vinylec (trademark)" K) 5 wt parts was heated/kneaded by a kneader to uniformly dissolve the polyvinyl formal and then, a curing agent, dicyandiamide (produced by Japan Epoxy Resins Co., DICY7) 3.5 wt parts and a curing accelerator, 3-(3,4-dichlorophenyl)-1,1-dimethyl urea (produced by Hodogaya Chemical Co., DCMU99) 4 wt parts were kneaded by a kneader to prepare an uncured epoxy resin composition. This epoxy resin composition was coated on a release paper of 100 thickness treated with a silicone coating by using a reverse roll coater to prepare a resin film (matrix resin film).

Next, as a continuous reinforcing fiber bundle, a carbon fiber sheet in which a large number of carbon fibers are arranged in one direction (reinforcing fiber sheet) was prepared. Diameter of the reinforcing fiber (single fiber) was 7 µm, tensile strength of the reinforcing fiber was 5.0 GPa, and the tensile modulus of the reinforcing fiber was 240 GPa. On each surface of the prepared reinforcing fiber sheet, the prepared resin film was superposed and by heat-pressing, the resin was impregnated into the reinforcing fiber sheet to prepare a prepreg sheet. The weight of reinforcing fiber per unit area in the obtained prepreg sheet was 100 g/m$^2$, the volume content Vf of reinforcing fiber was 50% and the thickness was 0.11 mm.

The obtained prepreg sheet was, by using an automatic cutter, cut in straight line at 25 mm interval in arranging direction of the reinforcing fiber and at an angle of 12° with the arranging direction of reinforcing fiber, to prepare a bias cut prepreg tape. Next, the prepared prepreg tape was cut in arranging direction of the reinforcing fiber at 5 mm interval in arranging direction of the reinforcing fiber, to prepare a chopped fiber bundle.

The obtained chopped fiber bundle had a width Wb of 5 mm, a thickness Tb of 110 µm, and a fiber length Lf of the reinforcing fiber 11 of 25 mm. There were transition sections 13a and 13b in which number of reinforcing fibers increases from tip portions of chopped fiber bundle toward center portion in arranging direction of the reinforcing fiber, and number of increase of the reinforcing fiber 11 per 1 mm in arranging direction of the reinforcing fiber 11 was 290 fibers±20 fibers. Also, change of total cross-sectional area of the large number of reinforcing fibers 11 in the transition sections 13a and 13b was 0.010 to 0.012 mm$^2$ per 1 mm in arranging direction of the reinforcing fiber 11.

The obtained chopped fiber bundles were randomly scattered on a release film such that its weight was made into approximately 6,000 g/m$^2$, and further thereon, another release film was put, lightly pressed on the release film, to integrate a large number of chopped fiber bundles with each other by the resin tackiness and obtained a molding material.

From this molding material, a sheet of 250 mm×250 mm size was cut out and the obtained sheet was arranged approximately on center portion of a flat mold having a cavity of 300×300 mm size. The charge ratio in this arrangement is 70%. After that, by a heat press molding machine, the matrix resin was cured under a pressure of 6 MPa, by a condition of 150° C.×30 minutes, to obtain a flat plate fiber reinforced plastic of 300×300 mm size.

In the mold cavity used, the fiber reinforced plastic had been filled and it was found that the flowability of molding material in molding step was good. The produced fiber reinforced plastic contacted in its entire surface with flat surface of test bed by only being placed on the flat surface of test bed, and it was found that there was no warp.

The thickness of the fiber reinforced plastic was 2.8 mm, and number of chopped fiber bundles present in thickness direction was measured by a cross-sectional observation at 10 points randomly selected on a surface of the fiber reinforced plastic and when the data of the 10 points were averaged, it was found to be 41. By this fact, it was found that the average thickness of the chopped fiber bundle was about 70 µm.

According to the result of tensile test of the fiber reinforced plastic, the tensile modulus was a very high value as 41 GPa and the tensile strength was a high value as 400 MPa. Compared to Comparative Example 5 to be mentioned later, increase of mechanical characteristics of 40% or more in modulus and 2.5 times or more in strength were obtained. Also, when the fiber reinforced plastic was cut out and the cut surface was observed, as shown in FIG. 11, chopped fiber bundle was getting thinner from the center portion toward the tip portion, in particular, chopped fiber bundle which runs parallel to the cut surface was also getting thinner from the center portion toward the tip portions, and the state in which the number of reinforcing fibers is decreasing can be seen, and it was found that a significant effect was obtained that not only tensile strength but also modulus were improved in the extent of improvement of load transmitting efficiency. Also, compared to Example 1, strength was increased and it was estimated to be due to prevention of linkage of cracks with each other by being the resin highly tough.

Example 5

Pellets of copolymerized polyamide resin (produced by Toray Industries, Inc., "Amilan" (trademark) CM4000, polyamide Jun. 66, 19610 copolymer, melting point 155° C.) were processed into a film state of 28 μm thickness by a press heated to 200° C., to prepare 2 thermoplastic resin sheets.

Next, as a continuous reinforcing fiber bundle, a carbon fiber sheet in which a large number of carbon fibers are arranged in one direction (reinforcing fiber sheet) was prepared. Diameter of the reinforcing fiber (single fiber) was 7 μm and the tensile strength was 5.0 GPa and the tensile modulus was 240 GPa. On the respective both surfaces of the prepared reinforcing fiber sheet, the prepared thermoplastic resin sheets were superposed and by heat-pressing, the resin was impregnated into the reinforcing fiber sheet, to prepare a prepreg sheet. The weight of reinforcing fiber per unit area in the obtained prepreg sheet was 100 g/m², the volume content Vf of reinforcing fiber was 50% and the thickness was 0.11 mm.

The obtained prepreg sheet was cut in the same way as Example 4, to prepare chopped fiber bundles. In the obtained chopped fiber bundle, the angle between the chopped fiber bundle tip portion (the sides 16a and 16b in FIG. 2) and the arranging direction of reinforcing fiber was 12°, the width Wb was 5 mm, thickness Tb was 110 μm, and the fiber length Lf of the reinforcing fiber 11 was 25 mm. There were transition sections 13a and 13b in which number of reinforcing fibers increases from tip portions of chopped fiber bundle toward center portion in arranging direction of the reinforcing fiber, and number of increase of the reinforcing fiber 11 per 1 mm in arranging direction of the reinforcing fiber 11 was 290 fibers±30 fibers. Also, change of total cross-sectional area of the large number of reinforcing fibers 11 in the transition sections 13a and 13b was 0.010 to 0.012 mm² per 1 mm in arranging direction of the reinforcing fiber 11.

About 370 g of the obtained chopped fiber bundles were randomly scattered on a flat mold having a cavity of 300×300 mm size. After that, the chopped fiber bundles were flowed by a heat press molding machine under a pressure of 6 MPa in a condition of 200° C.×1 minute, and after the mold was cooled without being opened, and a flat plate fiber reinforced plastic of 300×300 mm size was obtained by demolding.

In the mold cavity used, the fiber reinforced plastic had been filled and it was found that the flowability of molding material in molding step was good. The produced fiber reinforced plastic contacted in its entire surface with flat surface of test bed by only being placed on the flat surface of test bed, and it was found that there was no warp.

The thickness of the fiber reinforced plastic was 2.8 mm, and number of chopped fiber bundles present in thickness direction was measured by a cross-sectional observation at 10 points randomly selected on a surface of the fiber reinforced plastic and when the data of the 10 points were averaged, it was found to be 39. By this fact, it was found that the average thickness of the chopped fiber bundle was about 70 μm.

According to the result of tensile test of the fiber reinforced plastic, the tensile modulus was a very high value as 38 GPa and the tensile strength was a high value as 420 MPa. Also, when the fiber reinforced plastic was cut out and the cut surface was observed, as shown in FIG. 11, chopped fiber bundle was getting thinner from the center portion toward the tip portion, in particular, chopped fiber bundle which runs parallel to the cut surface was also getting thinner from the center portion toward the tip portions, and the state in which the number of reinforcing fibers is decreasing can be seen, and it was found that a significant effect was obtained that not only tensile strength but also modulus were improved in the extent of improvement of load transmitting efficiency.

Example 6

A vacuum assisted resin transfer molding (Va-RTM), in which a matrix resin was injected to a molding material comprising an aggregate of chopped fiber bundles where a large number of chopped fiber bundles were laminated in a state in which arranging directions of reinforcing fibers of each chopped fiber bundle were the same to obtain a fiber reinforced plastic, was carried out.

In the same way as Example 1, a chopped fiber bundle was prepared. A step of preparing a layered aggregate of chopped fiber bundles, in a state in which the arranging directions of reinforcing fibers of each chopped fiber bundle were made into the same by passing this chopped fiber bundle through a slit nozzle on a flat plate mold, was carried out desired times in a state in which the arranging directions of reinforcing fibers were different, to prepare a laminate (molding material) in which arranging directions of reinforcing fibers of each chopped fiber bundle in one aggregate of the chopped fiber bundles were the same but arranging directions of reinforcing fibers were different between the chopped fiber bundle assemblies to be laminated.

The laminate was prepared such that the arranging direction of reinforcing fiber in each layer of the laminated chopped fiber aggregate was made into [45/0/−45/90/−45/0/45] in order. Only the center 90° was made into 2 times thickness of the other layers.

As the resin (matrix resin) for injection, a liquid epoxy resin obtained by mixing "Epikote 807" (produced by Yuka Shell Epoxy KK) 70 wt parts and "Epikote 630" (produced by Yuka Shell Epoxy KK) 30 wt parts which are epoxy resins and "Ancamine 2049" (produced by Pacific Anchor Chemical Corp.) 43 wt parts which is an amine curing agent were used. At start of the injection, resin temperature was 50° C. and viscosity was 50 mPa·s.

To the mold, an injection port and a pressure reduction port of tube made of polyamide resin were provided, and all of them including the molding material were sealed by covering with a bagging film. To the injection port, a disposable cup containing the matrix resin was connected and to the pressure reduction port, a vacuum pump was connected, and a Va-RTM molding was carried out. After finishing the matrix resin injection, it was put into an oven together with the mold, heated to 100° C., maintained in that condition for 2 hours to cure the matrix resin, and it was demolded after the mold was cooled, to obtain a fiber reinforced plastic having no unimpregnated portion with the matrix resin.

Since it was a one side type molding by Va-RTM molding, one side was flat, but on another surface, welts of the reinforcing fiber were protruded and it was a fiber reinforced plastic having dispersion in thickness. There was no warp in this fiber reinforced plastic and its average thickness was 2.8 mm. Number of chopped fiber bundles present in thickness direction was measured by a cross-sectional observation at 10 points randomly selected on a surface of the fiber reinforced plastic and when the data of the 10 points were averaged, it was found to be 25. By this fact, it was found that the average thickness of the chopped fiber bundle was about 110 μm.

According to the result of tensile test of the fiber reinforced plastic, the tensile modulus was a very high value as 43 GPa and the tensile strength was a high value as 410 MPa. Also, when the fiber reinforced plastic was cut out and the cut surface was observed, as shown in FIG. 11, chopped fiber bundle was getting thinner from the center portion toward the tip portion, in particular, chopped fiber bundle which runs parallel to the cut surface was also getting thinner from the center portion toward the tip portions, and the state in which the number of reinforcing fibers is decreasing can be seen, and it was found that a significant effect was obtained that not only tensile strength but also modulus were improved in the extent of improvement of load transmitting efficiency.

Example 7

Fibers were opened by adding a vibration to the same continuous reinforcing fiber bundle as that of Example 1, to broaden the width of fiber bundle from original 5 mm to 20 mm. The broadened continuous reinforcing fiber bundle was, by using the same cutting means as Example 1, cut such that fiber length of reinforcing fiber was 25 mm, cut direction of the continuous reinforcing fiber bundle with respect to the arranging direction of reinforcing fiber was made into a straight line having an angle of 12°, to obtain a chopped fiber bundle. The obtained chopped fiber bundle had a shape of the chopped fiber bundle CFB1 shown in FIG. 1, that is, a shape of which length of the sides 16a and 16b, where reinforcing fibers were cut, was long. The obtained chopped fiber bundle CFB1 had, from tip portions toward the center portion, in arranging direction of the reinforcing fiber 11, the transition sections 13a and 13b in which number of reinforcing fibers increases, and the number of increase of the reinforcing fiber 11 in the transition sections 13a and 13b was, 120 fibers±20 fibers per 1 mm in arranging direction of the reinforcing fiber 11. The changes of total cross-sectional area of the large number of reinforcing fibers 11 in the respective transition sections 13a and 13b were 0.004 to 0.005 mm$^2$ per 1 mm in arranging direction of the reinforcing fiber 11.

By using the obtained chopped fiber bundle CFB1, an SMC sheet was prepared in the same way as Example 1, and by using the prepared SMC sheet, a fiber reinforced plastic was molded in the same way as Example 1.

The molded fiber reinforced plastic had been filled in the mold cavity used, and it was found that the flowability of molding material in molding step was good. The produced fiber reinforced plastic contacted in its entire surface with flat surface of test bed by only being placed on the flat surface of test bed, and it was found that there was no warp.

The thickness of the fiber reinforced plastic was 2.8 mm, and number of chopped fiber bundles present in thickness direction was measured by a cross-sectional observation at 10 points randomly selected on a surface of the fiber reinforced plastic and when the data of the 10 points were averaged, it was found to be 90. By this fact, it was found that the average thickness of the chopped fiber bundle was about 30 µm. Since the length of the sides 16a and 16b, where reinforcing fibers were cut, of the chopped fiber bundle CFB1 was long, the chopped fiber bundle is easy to be opened at molding the fiber reinforced plastic, and it is estimated that, as a result, thickness the chopped fiber bundle in the obtained fiber reinforced plastic became thin.

According to the result of tensile test of the fiber reinforced plastic, the tensile modulus was a very high value as 39 GPa and the tensile strength was a high value as 410 MPa. Compared to Comparative Example 1 to be mentioned later, increase of mechanical characteristics of 60% or more in modulus and 2.5 times or more in strength were obtained. Also, when the fiber reinforced plastic was cut out and the cut surface was observed, as shown in FIG. 11, chopped fiber bundle was getting thinner from the center portion toward the tip portion, in particular, chopped fiber bundle which runs parallel to the cut surface was also getting thinner from the center portion toward the tip portions, and the state in which the number of reinforcing fibers is decreasing can be seen, and it was found that a significant effect was obtained that not only tensile strength but also modulus were improved in the extent of improvement of load transmitting efficiency.

Example 8

On the same continuous reinforcing fiber bundle as Example 1, the same pellet of the copolymerized polyamide resin as Example 5 was heated at 200° C. and pressed, to impregnate into the continuous reinforcing fiber bundle with the above-mentioned copolymerized polyamide resin as a matrix resin, and prepared a yarn prepreg of which volume content Vf of the reinforcing fiber was 50%. The obtained yarn prepreg was cut, by using the same cutting means as Example 1, such that fiber length of the reinforcing fiber was 25 mm and a cut direction of reinforcing fiber was made into a straight line having an angle of 12° with respect to the arranging direction of reinforcing fiber, to obtain a chopped fiber bundle. The width Wb of the obtained chopped fiber bundle was 5.5 mm and the thickness Tb was 170 µm. The obtained chopped fiber bundle had, from the tip portions toward the center portion, in orientation direction of the reinforcing fiber, the transition sections 13a and 13b in which number of reinforcing fibers increases, and number of increase of the reinforcing fiber 11 in the transition sections 13a and 13b was 460 fibers±50 fibers per 1 mm in arranging direction of the reinforcing fiber. The changes of total cross-sectional area of the large number of reinforcing fibers 11 in the respective transition sections 13a and 13b were 0.016 to 0.020 mm$^2$ per 1 mm in arranging direction of the reinforcing fiber.

By using the obtained chopped fiber bundle, in the same way as Example 5, a fiber reinforced plastic was molded.

Since the molded fiber reinforced plastic had been filled in the mold cavity used, and it was found that the flowability of molding material in molding step was good. The produced fiber reinforced plastic contacted in its entire surface with flat surface of test bed by only being placed on the flat surface of test bed, and it was found that there was no warp.

The thickness of the fiber reinforced plastic was 2.8 mm, and number of chopped fiber bundles present in thickness direction was measured by a cross-sectional observation at 10 points randomly selected on a surface of the fiber reinforced plastic and when the data of the 10 points were averaged, it was found to be 28. By this fact, it was found that the average thickness of the chopped fiber bundle was about 100 µm.

According to the result of tensile test of the fiber reinforced plastic, the tensile modulus was a very high value as 33 GPa and the tensile strength was a high value as 380 MPa. Also, when the fiber reinforced plastic was cut out and the cut surface was observed, as shown in FIG. 11, chopped fiber bundle was getting thinner from the center portion toward the tip portion, in particular, chopped fiber bundle which runs parallel to the cut surface was also getting thinner from the center portion toward the tip portions, and the state in which the number of reinforcing fibers is decreasing can be seen, and it was found that a significant effect was obtained that not only tensile strength but also modulus were improved in the extent of improvement of load transmitting efficiency.

Example 9

A chopped fiber bundle was prepared in the same way as Example 1. The same resin film (matrix resin film) as Example 4 was placed on a flat plate mold, and on the surface of this resin film, the prepared chopped fiber bundles were accumulated in a sheet state such that, by passing through a slit nozzle, arranging direction of the reinforcing fibers of each chopped fiber bundle was made within the range of ±10°. After that, the same resin film was placed on the chopped fiber bundle accumulated in the sheet state. The laminate sheet obtained comprising the lower side resin sheet, the middle chopped fiber bundle sheet and the upper side resin sheet was passed between calender rolls of a temperature of 60° C. to impregnate into the chopped fiber bundle with the matrix resin, to prepare a prepreg sheet. The weight of reinforcing fiber per unit area in the obtained prepreg sheet was 200 g/m$^2$, the volume content Vf of reinforcing fiber was 50% and the thickness was 0.22 mm.

The obtained prepreg sheets were laminated in a laminate constitution of [45/0/−45/90]$_s$ to obtain a laminate of 250× 250 mm size. This laminate was arranged approximately on center portion of a flat mold having a cavity of 300×300 mm size. The charge ratio in this arrangement is 70%. After that, by a heat press molding machine, the matrix resin was cured under a pressure of 6 MPa, by a condition of 150° C.×5 minutes, to obtain a flat plate fiber reinforced plastic of 300× 300 mm size.

In the mold cavity used, the fiber reinforced plastic had been filled and it was found that the flowability of molding material in molding step was good. The produced fiber reinforced plastic contacted in its entire surface with flat surface of test bed by only being placed on the flat surface of test bed, and it was found that there was no warp. The thickness of the fiber reinforced plastic was, 1.8 mm.

According to the result of tensile test of the fiber reinforced plastic, the tensile modulus was a very high value as 41 GPa and the tensile strength was a high value as 420 MPa. Strength dispersion, CV value, was very low as 7%, and it was estimated that the dispersion of mechanical characteristics of fiber reinforced plastic was reduced by laminating the chopped fiber bundle sheets while controlling the arranging direction of reinforcing fiber.

Example 10

The same continuous reinforcing fiber bundle as Example 1 was cut by the same cutting method as Example 1, such that the fiber length of reinforcing fiber was 25 mm, and the cutting direction of the continuous reinforcing fiber bundle was made into a straight line of an angle of 12° with respect to the arranging direction of reinforcing fiber, to obtain a chopped fiber bundle. The obtained chopped fiber bundles and the same copolymerized polyamide resin (matrix resin) pellet as Example 5 were kneaded by a melt-extruder (produced by The Japan Steel Works, Ltd., TEX30α, L/D=31.5, screw revolution number 250 rpm, temperature 180 to 200° C.), to extrude into a rod state, and the obtained rod-like molded article was cut into a pellet state, to obtain a pellet of a volume content Vf of reinforcing fiber of 20%. The weight average fiber length in the obtained pellet was 0.5 mm. The obtained pellet was subjected to an injection molding at a temperature of 210° C., and obtained a flat plate fiber reinforced plastic of 250×250 mm size.

According to the result of tensile test of the fiber reinforced plastic, it showed that the tensile modulus was 15 GPa, and the tensile strength was high as 220 MPa. Compared to Comparative Example 6 to be mentioned later, increase of mechanical characteristics of 20% or more in modulus and 20% or more in strength were obtained. Since tip portions of each reinforcing fiber in the chopped fiber bundle are shifted with each other in arranging direction of the reinforcing fiber, the reinforcing fibers are easy to be separated with each other in the pelletizing step and hardly cohere, it is possible to produce a pellet of which fiber length is long, and as a result, it is estimated that, even after an injection molding, a relatively long fiber length is maintained, to exhibit high mechanical characteristics of the fiber reinforced plastic.

Comparative Example 1

This comparative example relates to an SMC sheet comprising a conventional chopped fiber bundle obtained by cutting continuous reinforcing fiber bundle in a direction of angle of 90° with respect to arranging direction of the reinforcing fiber.

At obtaining the chopped fiber bundle by cutting the same continuous reinforcing fiber bundle as Example 1, blades were provided along peripheral direction of a rotary cutter at 25 mm interval, and the continuous reinforcing fiber bundle was inserted at an angle of 90° with respect to the blades. The obtained chopped fiber bundle had a fiber length of reinforcing fiber of 25 mm, and the tip portion of chopped fiber bundle had a straight line shape of an angle of 90° with respect to the arranging direction of reinforcing fibers of the chopped fiber bundle.

By using this chopped fiber bundle, an SMC sheet was prepared in the same way as Example 1, and by using the prepared SMC sheet, a fiber reinforced plastic was molded in the same way as Example 1.

In the mold cavity used, the molded fiber reinforced plastic had been filled and it was found that flowability in molding step of the molding material had been good. The produced fiber reinforced plastic had no warp and its thickness was 2.8 mm.

According to the result of tensile test of the fiber reinforced plastic, the tensile modulus was 24 GPa and the tensile strength was 150 MPa. Also, when the fiber reinforced plastic was cut to observe the cut surface, as shown in FIG. 12, the chopped fiber bundles which run parallel to the cut surface were cut perpendicular in thickness direction (in FIG. 12, up and down direction (vertical direction)) at the tip portions, and beyond the tip portions, the resin paddles 126 were produced. In some of such resin paddles 126, voids were generated.

Comparative Example 2

This comparative example relates to an SMC sheet comprising chopped fiber bundles of which fiber length is longer than Comparative Example 1, and has an across length Ld of the chopped fiber bundle of the same level as Example 1.

At obtaining the chopped fiber bundle by cutting the same continuous reinforcing fiber bundle as Example 1, blades were provided along peripheral direction of a rotary cutter at 50 mm interval, and the continuous reinforcing fiber bundle was inserted at an angle of 90° with respect to the blades. The obtained chopped fiber bundle had a fiber length of reinforcing fiber of 50 mm, and the tip portion of chopped fiber bundle had a straight line shape of an angle of 90° with respect to the arranging direction of reinforcing fibers of the chopped fiber bundle.

By using this chopped fiber bundle, an SMC sheet was prepared in the same way as Example 1, and by using the prepared SMC sheet, a fiber reinforced plastic was molded in the same way as Example 1.

In the mold cavity used, the molded fiber reinforced plastic had been filled and it was found that flowability in molding step of the molding material had been good. The produced fiber reinforced plastic had no warp and its thickness was 2.8 mm.

According to the result of tensile test of the fiber reinforced plastic, the tensile modulus was 26 GPa and the tensile strength was 160 MPa, i.e., it showed almost the same level of mechanical characteristics as that of Comparative Example 1. It was found that by SMC sheet comprising conventional chopped fiber bundle, even if fiber length is made long, it has almost no contribution to improvement of mechanical characteristics of the fiber reinforced plastic.

Comparative Example 3

This comparative example relates to an SMC sheet comprising a chopped fiber bundle obtained by cutting continuous reinforcing fiber bundle in a direction of angle 45° with respect to arranging direction of the reinforcing fiber.

At obtaining the chopped fiber bundle by cutting the same continuous reinforcing fiber bundle as Example 1, blades were provided at 17.7 mm interval along peripheral direction of a rotary cutter, and the continuous reinforcing fiber bundle was inserted at an angle of 45° with respect to the blades. The obtained chopped fiber bundle had a fiber length of reinforcing fiber of 25 mm, and the tip portion of chopped fiber bundle had a straight line shape of an angle of 45° with respect to the arranging direction of reinforcing fibers of the chopped fiber bundle. From the tip portion of the chopped fiber bundle to the center portion, in arranging direction of the reinforcing fiber, there were transition sections in which number of reinforcing fibers increases, and the number of increase of the reinforcing fiber was 2,400 fibers±100 fibers per 1 mm in arranging direction of the reinforcing fiber. Also, change of total cross-sectional area of the large number of reinforcing fibers in the transition section was 0.088 to 0.096 mm² per 1 mm in arranging direction of the reinforcing fiber.

By using this chopped fiber bundle, an SMC sheet was prepared in the same way as Example 1, and by using the prepared SMC sheet, a fiber reinforced plastic was molded.

In the mold cavity used, the molded fiber reinforced plastic had been filled and it was found that flowability in molding step of the molding material had been good. The prepared fiber reinforced plastic had no warp and its thickness was 2.8 mm.

According to the result of tensile test of the fiber reinforced plastic, the tensile modulus was 25 GPa and the tensile strength was 200 MPa. Compared to Comparative Example 1, although the strength was high, a significant improvement was not found. Also, in modulus, almost no improvement was found.

Comparative Example 4

As the continuous reinforcing fiber bundle, a continuous reinforcing fiber bundle (RS570M-521ZS, fiber weight 570 tex, produced by Nitto Boseki Co., Ltd.) comprising a large number of glass fibers to which a sizing agent was deposited as that of Example 3, was used. This continuous reinforcing fiber bundle was taken out from a bobbin by axial unwinding in twisted state, cut in the same way as Comparative Example 1, to obtain a chopped fiber bundle. The obtained chopped fiber bundle has a fiber length of reinforcing fiber of 25 mm and tip portion of the chopped fiber bundle had straight line shape of an angle of 90° with respect to arranging direction of reinforcing fibers of the chopped fiber bundle.

By using this chopped fiber bundle, an SMC sheet was prepared in the same way as Example 3, and by using the prepared SMC sheet, a fiber reinforced plastic was molded in the same way as Example 3.

In the mold cavity used, the molded fiber reinforced plastic had been filled and it was found that flowability in molding step of the molding material had been good. The prepared fiber reinforced plastic had no warp and its thickness was 2.8 mm. Also, according to the result of tensile test of the fiber reinforced plastic, the tensile modulus was 15 GPa and the tensile strength was 180 MPa.

Comparative Example 5

In the same way as Example 4, a prepreg was prepared and by using an automatic cutter, it was cut in straight line at 25 mm interval in arranging direction of the reinforcing fiber and at 5 mm interval in perpendicular direction with respect to arranging direction of the reinforcing fiber (width direction of arranged reinforcing fiber), to prepare a chopped fiber bundle of width 5 mm, thickness 110 μm and fiber length of reinforcing fiber 25 mm. The obtained chopped fiber bundle had a fiber length of reinforcing fiber of 25 mm, and its tip portion of chopped fiber bundle was a straight line shape of an angle of 90° with respect to arranging direction of reinforcing fibers of the chopped fiber bundle.

By using this chopped fiber bundle, a molding material was prepared in the same way as Example 4, and by using the prepared molding material, a fiber reinforced plastic was molded in the same way as Example 4.

In the mold cavity used, the molded fiber reinforced plastic had been filled and it was found that flowability in molding step of the molding material had been good. The prepared fiber reinforced plastic had no warp and its thickness was 2.8 mm.

According to the result of tensile test of the fiber reinforced plastic, the tensile modulus was 29 GPa and the tensile strength was 150 MPa. Also, when the fiber reinforced plastic was cut to observe the cut surface, as shown in FIG. 12, the chopped fiber bundles which run parallel to the cut surface were cut perpendicular in thickness direction (in FIG. 12, up and down direction (vertical direction)) at the tip portions, and at the tip of the tip portions, the resin paddles 126 were produced. In some of such resin paddles 126, voids were generated.

Comparative Example 6

A pellet was prepared by using the same chopped fiber bundle as Comparative Example 1 and by pelletizing in the same way as Example 10. The weight average fiber length in the obtained pellet was 0.3 mm. By using the obtained pellet, an injection molding was carried out in the same way as Example 10, to mold a flat plate fiber reinforced plastic. According to the result of tensile test of the obtained fiber reinforced plastic, the tensile modulus was 12 GPa and the tensile strength was 180 MPa.

INDUSTRIAL APPLICABILITY

A chopped fiber bundle which has good flowability and conformability in the case where it is used as a molding material, and exhibits excellent mechanical property in the case where it is used as a fiber reinforced plastic, and a production method thereof are provided. Also, a molding material, a fiber reinforced plastic and a production method thereof in which the chopped fiber bundle is used are provided.

The molding material or the fiber reinforced plastic are preferably used for production of members for sports goods such as bicycle parts, or shaft or head of golf club, interior materials for aircraft, automobile parts such as door or sheet frame, machine parts such as robot arm in which strength, rigidity and lightness are required. Among them, they are preferably used for automobile parts such as sheet panel or sheet frame in which, in addition to strength and lightness, conformability to complicated shape at molding is required.

The invention claimed is:

1. A chopped fiber bundle comprising:
   (a) reinforcing fibers unidirectionally arranged and a bundling agent which bundles said reinforcing fibers, wherein
   (b) the length of each of said reinforcing fibers is 5 to 100 mm,
   (c) said chopped fiber bundle has a first transition section in which the number of said reinforcing fibers in a cross section of said chopped fiber bundle perpendicular to the arranging direction of said reinforcing fibers increases from a first tip which is one in the arranging direction of said reinforcing fibers toward a second tip which is another tip and also has a second transition section in which the number of said reinforcing fibers in a cross section of said chopped fiber bundle perpendicular to the arranging direction of said reinforcing fibers increases from said second tip toward said first tip,
   (d) said chopped fiber bundle has a constant section located between said first transition section and said second transition section in the arranging direction of said reinforcing fibers, wherein the number of reinforcing fibers in the cross section of the fiber bundle in said constant section is constant in the arranging direction of said reinforcing fibers, and wherein one end face of said constant section coincides with a first terminal end face of said first transition section which is at an opposite end of said first tip while another end face of said constant section coincides with a second terminal end face of said second transition section which is at an opposite end of said second tip, or wherein said first terminal end face directly coincides with said second terminal end face,
   (e) a change of the total cross-sectional area of said reinforcing fibers in the cross section of said chopped fiber bundle per 1 mm in the arranging direction of said reinforcing fibers between said first tip and said second tip is 0.05 mm$^2$ or less, and
   (f) all of said reinforcing fibers have the same length.

2. The chopped fiber bundle according to claim 1, wherein the maximum value of the total cross-sectional area of said reinforcing fibers in the cross section of said chopped fiber bundle is 0.1 mm$^2$ or more.

3. The chopped fiber bundle according to claim 1, wherein the maximum value of the total cross-sectional area of said reinforcing fibers in the cross section of said chopped fiber bundle is less than 0.1 mm$^2$ and a change of the number of said reinforcing fibers in the cross section of said chopped fiber bundle per 1 mm in the arranging direction of said reinforcing fibers between said first tip and said second tip is 30% or less of the maximum number of reinforcing fibers.

4. The chopped fiber bundle according to claim 1, wherein said reinforcing fibers are carbon fibers, the number of said carbon fibers is 1,000 to 700,000, and between said first tip and said second tip, a change of the number of said reinforcing fibers in the cross section of said chopped fiber bundle per 1 mm in the arranging direction of said reinforcing fibers is 1,400 or less.

5. The chopped fiber bundle according to claim 1, wherein a value of ratio Wb/Tb is 20 to 400, where Wb represents width of said fiber bundle measured perpendicular to the arranging direction of said reinforcing fibers in a plan view which has a state that said width becomes largest, while Tb represents the maximum thickness of said chopped fiber bundle measured perpendicular to the plan view.

6. The chopped fiber bundle according to claim 1, wherein, in a plan view which has a state that the width of said fiber bundle becomes largest, a side extending from said tip to an end forms a straight segment in the arranging direction of said reinforcing fibers in an external shape of each of the transition sections while another side forms a straight segment inclined by an angle of 2 to 30° from the arranging direction of said reinforcing fibers.

7. The chopped fiber bundle according to claim 1, wherein said bundling agent is a sizing agent used to produce the reinforcing fiber bundle and an amount of the sizing agent accounts for 0.1 to 10 mass % of the chopped fiber bundle.

8. The chopped fiber bundle according to claim 1, wherein said bundling agent is a matrix resin used to produce a resin molded material containing reinforcing fibers and an amount of the matrix resin accounts for 20 to 75 mass % of the chopped fiber bundle.

9. A chopped fiber bundle comprising:
   (a) reinforcing fibers unidirectionally arranged and a bundling agent which bundles said reinforcing fibers, wherein
   (b) the length of each of said reinforcing fibers is 5 to 100 mm,
   (c) said chopped fiber bundle has a first transition section in which the number of said reinforcing fibers in a cross section of said chopped fiber bundle perpendicular to the arranging direction of said reinforcing fibers increases from a first tip which is one in the arranging direction of said reinforcing fibers toward a second tip which is another tip and also has a second transition section in which the number of said reinforcing fibers in a cross section of said chopped fiber bundle perpendicular to the arranging direction of said reinforcing fibers increases from said second tip toward said first tip,
   (d) said chopped fiber bundle has a constant section located between said first transition section and said second transition section in the arranging direction of said reinforcing fibers, wherein the number of reinforcing fibers in the cross section of the fiber bundle in said constant section is constant in the arranging direction of said reinforcing fibers, and wherein one end face of said constant section coincides with a first terminal end face of said first transition section which is at an opposite end of said first tip while another end face of said constant section coincides with a second terminal end face of said second transition section which is at an opposite end of said second tip, or wherein said first terminal end face directly coincides with said second terminal end face,
   (e) a change of the total cross-sectional area of said reinforcing fibers in the cross section of said chopped fiber bundle per 1 mm in the arranging direction of said reinforcing fibers between said first tip and said second tip is 0.05 mm$^2$ or less, and
   (f) all of said reinforcing fibers in said chopped fiber bundle are substantially unidirectionally arranged.

10. The chopped fiber bundle according to claim 9, wherein the maximum value of the total cross-sectional area of said reinforcing fibers in the cross section of said chopped fiber bundle is 0.1 mm² or more.

11. The chopped fiber bundle according to claim 9, wherein the maximum value of the total cross-sectional area of said reinforcing fibers in the cross section of said chopped fiber bundle is less than 0.1 mm² and a change of the number of said reinforcing fibers in the cross section of said chopped fiber bundle per 1 mm in the arranging direction of said reinforcing fibers between said first tip and said second tip is 30% or less of the maximum number of reinforcing fibers.

12. The chopped fiber bundle according to claim 9, wherein all of said reinforcing fibers have the same length.

13. The chopped fiber bundle according to claim 9, wherein said reinforcing fibers are carbon fibers, the number of said carbon fibers is 1,000 to 700,000, and between said first tip and said second tip, a change of the number of said reinforcing fibers in the cross section of said chopped fiber bundle per 1 mm in the arranging direction of said reinforcing fibers is 1,400 or less.

14. The chopped fiber bundle according to claim 9, wherein a value of ratio Wb/Tb is 20 to 400, where Wb represents width of said fiber bundle measured perpendicular to the arranging direction of said reinforcing fibers in a plan view which has a state that said width becomes largest, while Tb represents the maximum thickness of said chopped fiber bundle measured perpendicular to the plan view.

15. The chopped fiber bundle according to claim 9, wherein, in a plan view which has a state that the width of said fiber bundle becomes largest, a side extending from said tip to an end forms a straight segment in the arranging direction of said reinforcing fibers in an external shape of each of the transition sections while another side forms a straight segment inclined by an angle of 2 to 30° from the arranging direction of said reinforcing fibers.

16. The chopped fiber bundle according to claim 9, wherein said bundling agent is a sizing agent used to produce the reinforcing fiber bundle and an amount of the sizing agent accounts for 0.1 to 10 mass % of the chopped fiber bundle.

17. The chopped fiber bundle according to claim 9, wherein said bundling agent is a matrix resin used to produce a resin molded material containing reinforcing fibers and an amount of the matrix resin accounts for 20 to 75 mass % of the chopped fiber bundle.

* * * * *